United States Patent
Stafford et al.

(10) Patent No.: US 11,442,532 B2
(45) Date of Patent: Sep. 13, 2022

(54) CONTROL OF PERSONAL SPACE CONTENT PRESENTED VIA HEAD MOUNTED DISPLAY

(71) Applicant: Sony Interactive Entertainment Inc., Tokyo (JP)

(72) Inventors: Jeffrey Roger Stafford, Redwood City, CA (US); Frederick Umminger, Oakland, CA (US); Richard Marks, Pleasanton, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/020,268

(22) Filed: Sep. 14, 2020

(65) Prior Publication Data
US 2020/0409453 A1 Dec. 31, 2020

Related U.S. Application Data

(63) Continuation of application No. 14/684,308, filed on Apr. 10, 2015, now Pat. No. 10,775,878.

(51) Int. Cl.
| | |
|---|---|
| *G06F 16/9535* | (2019.01) |
| *G06F 3/01* | (2006.01) |
| *G06F 16/954* | (2019.01) |
| *G02B 27/01* | (2006.01) |
| *G06F 3/03* | (2006.01) |
| *G06F 3/0487* | (2013.01) |
| *G06F 3/16* | (2006.01) |
| *G06T 13/40* | (2011.01) |

(Continued)

(52) U.S. Cl.
CPC ............ *G06F 3/011* (2013.01); *G02B 27/017* (2013.01); *G06F 3/0304* (2013.01); *G06F 3/0487* (2013.01); *G06F 3/16* (2013.01); *G06F 16/954* (2019.01); *G06F 16/9535* (2019.01); *G06T 13/40* (2013.01); *G06T 19/006* (2013.01); *G09G 5/377* (2013.01)

(58) Field of Classification Search
CPC .... G06F 3/011; G06F 16/9535; G06F 16/954; G06F 3/0304; G06F 3/0487; G06F 3/16; G02B 27/017; G06T 13/40; G06T 19/006; G09G 5/377
See application file for complete search history.

(56) References Cited

U.S. PATENT DOCUMENTS

| | | | |
|---|---|---|---|
| 6,675,384 B1 * | 1/2004 | Block | ...................... H04N 7/06 348/E5.096 |
| 2011/0298827 A1 * | 12/2011 | Perez | .................. G06K 9/00355 345/647 |

(Continued)

*Primary Examiner* — Jeff Piziali
(74) *Attorney, Agent, or Firm* — Penilla IP, APC

(57) ABSTRACT

Methods and systems for filtering content include identifying content for presenting in a rendering space defined by one or more mechanisms of a head mounted display (HMD), wherein the content is interactive, streaming content. A rating score for the content is identified. The content is dynamically adjusted to selectively filter a portion of the content based on a user profile of the user, rating score of the content, and ongoing interactions detected at the content. The adjusted content is formatted for rendering on the HMD. The formatted content is automatically transmitted to the HMD for rendering, in response to the request.

18 Claims, 15 Drawing Sheets

(51) Int. Cl.
*G06T 19/00* (2011.01)
*G09G 5/377* (2006.01)

(56) References Cited

U.S. PATENT DOCUMENTS

2013/0004068 A1* 1/2013 Koo .................. G06K 9/342
382/165
2014/0204117 A1* 7/2014 Kinnebrew ............. G06F 16/44
345/633

* cited by examiner

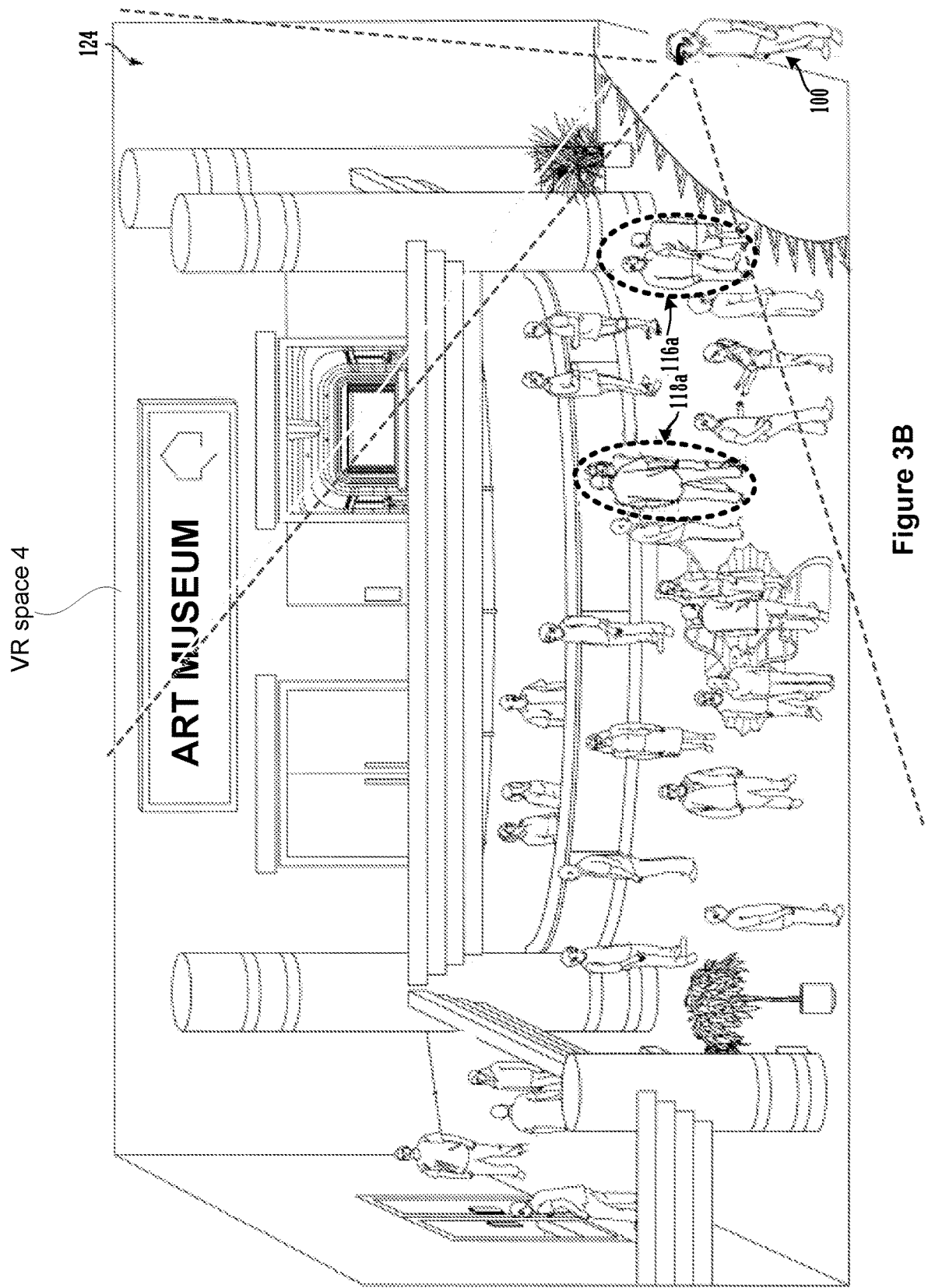

CONTROL OF PERSONAL SPACE CONTENT PRESENTED VIA HEAD MOUNTED DISPLAY

CLAIM OF PRIORITY

This application is a continuation of and claims priority, under 35 U.S.C. § 120, to U.S. patent application Ser. No. 14/684,308, filed on Apr. 10, 2015, and entitled, "Control of Personal Space Content Presented Via Head Mounted Display," which is incorporated herein by reference in its entirety for all purposes.

CROSS-REFERENCE TO RELATED APPLICATION

This application is related to: (1) U.S. Provisional Patent Application No. 62/146,192, entitled "FILTERING AND PARENTAL CONTROL METHODS FOR RESTRICTING VISUAL ACTIVITY ON A HEAD MOUNTED DISPLAY", filed on Apr. 10, 2015, which is hereby incorporated by reference in its entirety.

FIELD

The present disclosure relates to systems and methods for viewing content, and more specifically to controlling content viewed through a head-mounted display.

BACKGROUND

Description of the Related Art

One of the rapidly growing technologies is in the field of human-computer interactions using head-mounted or head-coupled displays (HMD). The HMDs are portable devices that can be worn on a user's head and include a display or other forms of light imaging devices in front of one or both eyes of the user. Various applications (business, commercial, entertainment, physical training, travel, social media, etc.) have been developed to enable provisioning appropriate content to the user through the HMDs. The content provided by these applications may just include content from virtual-life environment, where the images presented in the HMD are created by a computing device, in order to provide total immersive experience to a user, or may encompass a mixture of content from real-life environment and virtual-life environment to allow the user to switch between virtual world and real-world.

Sometimes, the content provided through the HMD may include content, such as gestures, actions, language, graphics, etc., that may not be appropriate for a user's viewing. However, currently there is no way of preventing such content from being presented to the user. This is especially true when the content is generated or provided by an external content source, by another user or by an application.

It is within this context that embodiments of the invention arise.

SUMMARY OF THE INVENTION

Embodiments of the present disclosure provide ways to control content presented by one or more mechanisms of a head mounted display (HMD) of a user by preserving quality of the content presented to the user. The content presented may be computer generated graphics that depict a virtual world, such as gaming content, etc., or may be user generated/captured scenes/content that are associated with a geo location, real-world object, real-world event, real-world scene, content provided by an application, social media interaction, etc., or augmented reality content wherein real-world content captured/generated by a user or content provider is overlaid with computer generated content, and can include different components, such as audio component, video component, graphic component, textual component, etc. An application, such as a content streaming processor application, providing the environment for rendering using one or more mechanisms of the HMD, will identify when to apply filters to content based on user profile of the user wearing the HMD. The user profile identifies the user related attributes and content viewing privileges defined for the user profile. Additionally, the user profile may also identify each user's individual preferences for the content. In some embodiments, the filtering causes some content that are inappropriate to not be rendered at all, while in other embodiments, the content that are inappropriate may be changed, modified or replaced with other content that are filter appropriate for the user's profile. In some embodiments, the filtering may be performed to only allow content that are generated or provided by specific ones of users/social contacts that interact with or are associated with the user wearing the HMD, or to only include content from a trusted source. In such embodiments, additional filtering may be provided to ensure that such content complies with the user profile of the user wearing the HMD. In some embodiments, in addition to filtering out unwanted or inappropriate portions of the content, the filtering may also be used to customize the content in accordance to user preferences specified by a user. For example, a user may desire to have the content presented in a particular format, such as in a specific language (Chinese or Taiwanese vs. English), a particular style (cartoon form vs. Anime form), using a particular background (audio or graphic/image), etc. Such user specifications may be applied to the filtered content before being presented for rendering on the HMD.

In some embodiments, the content may be associated with a plurality of components and only a particular component of a portion of the content may be replaced, modified or filtered out while the remaining components of the portion of the content may remain unaltered. For example, an audio component may be filtered out from a video content that is being presented to the user wearing the HMD. In some embodiments, the filtering may be done ahead of time by a computing device, such as a game console, communicatively connected to the HMD by determining direction and movement of the user within the VR space based on the user's input. In some embodiments, in addition to pre-screening the content, additional filtering may be performed prior to the content being streamed to the HMD.

In one embodiment, a method is provided. The method includes identifying content for presenting in a rendering space defined by one or more mechanisms of a head mounted display (HMD) of a user. The content is identified, in response to a request from the user. The content is interactive content and dynamically changes based on actions or interactions of the user. A rating score is identified for the content. The content is dynamically adjusted to selectively filter a portion of the content based on the identified rating score and a user profile of the user. The adjusted content is rendered on the HMD. The dynamic adjustment to the content continues during a session so that different portions of the content are selectively filtered based on changes in the content determined by the actions or interactions of the user with the content presented in the rendering space.

In some embodiments, the rating score is generated based on rating data received from one or more content publishers, or one or more users, or an authorized rating source, or a historical rating, or combinations of two or more thereof.

In some embodiments, the portion of the content corresponds to a virtual object or a virtual graphic within the content or an avatar of another user that interacts with the content presented in the rendering space along with the user.

In some embodiments, the portion of the content for selective filtering is identified by applying pre-defined filtering rules to the content. The pre-defined filtering rules are specific for the user profile of the user requesting the content.

In some embodiments, the pre-defined filtering rules applied for selective filtering are based on user demographics or user attributes of the user or user attributes of other users interacting with the content or actions detected at the content rendered in the rendering space or context of the portion of the content or rating score of the portion of the content, or any combinations of two or more thereof.

In some embodiments, the selective filtering of the portion of the content includes identifying a component associated with the portion of the content that needs to be selectively filtered and selectively overlaying a portion of the identified component of the portion of the content using a component overlay identified for the portion of the component being selectively filtered.

In some embodiments, the component that is to be selectively filtered is an audio component and the selective overlaying includes identifying a different audio component that is in accordance to the user profile of the user. The different audio component is selectively overlaid over the portion of the component.

In some embodiments, the component that is to be selectively filtered is one of a video component, a text component, or a graphic component of the portion of the content and the selective overlaying includes identifying a different video, text or graphic component that is in accordance to the user profile of the user. The different video, text, or graphic component being selectively overlaid over the portion of the video, text or graphic component of the content.

In some embodiments, an option is provided to dynamically update the user profile of the user based on context of the content identified for presenting in the rendering space.

In some embodiments, a history of content presented for rendering in the rendering space, is maintained, wherein the history identifies context of different portions of the content.

In some embodiments, the history is reviewed in accordance to pre-defined filtering rules associated with the user profile of the user to identify a particular portion of the content presented within the rendering space having context that is similar to the context of the portion of the content that was filtered out, and providing an option to update the pre-defined filtering rules associated with the user profile of the user so as to allow filtering of the particular portion of the content during future rendition. The reviewing of the history and updating of the pre-defined filtering rules carried out periodically.

In some embodiments, a system is provided. The system includes a content streaming processor module, which when executed by a processor of a computing device is configured to control content that is identified for rendering in a rendering space defined by one or more mechanisms of a head mounted display (HMD) of a user, in response to a request from the user. The content provided for rendering is interactive streaming content that dynamically changes based on actions or interactions by the user. The content streaming processor module includes a content filtering module, a content interactivity module, and a content rendering module. The content filtering module is configured to produce adjusted content by selectively filtering a portion of the content based on a user profile of the user requesting the content and a rating score identified for the content. The content interactivity module is configured to process interactive input received for the content from a user wearing the HMD and to provide the processed input data to the content filtering module to update the content identified for rendering via the HMD. The content rendering module is configured to format the adjusted content for rendering via the HMD.

In some embodiments, the rendering space is defined as one of a virtual reality space rendering content from a virtual reality world or an augmented reality space rendering content from a real-world super-imposed/overlaid with computer-generated content defined on a display screen of a HMD or a space defined on a part of a user's eye.

In some embodiments, the system further includes a dynamic rating generator module that is configured to generate a rating score for the content by obtaining rating data for the content from one or more content publishers, or one or more authorized rating sources, or one or more users, or a historical rating maintained in a historical ratings database, or combinations of two or more thereof.

In some embodiments, the system further includes an input processing module that is configured to receive input provided by the user through an input device and through the HMD, and to interpret the input. The interpreted input is provided to the content interactivity module to adjust the content presented in the rendering space, or to a user rating module to affect the rating score of the content.

In some embodiments, the system further includes a position and navigation module that is configured to capture image data associated with the user wearing the HMD and to analyze the image data to determine relative location of the user, relative position of the HMD, relative position of an input device used by the user for providing input, and to determine movement and direction of the user input in the rendering space based on the analysis of the captured image data. The movement and direction of the user is provided as input to the content filtering module to allow the content filtering module to pre-analyze the content that is to be presented in the direction of movement and to selectively pre-filter the content in accordance to the user profile. The pre-analysis and pre-filtering performed in anticipation of the user moving in the direction defined by the user input.

In some embodiments, the system further includes a user profile module configured to determine pre-defined filtering rules to be applied in accordance to user profile defined for a user. The user profile identifies user preferences and privileges for viewing the content.

In some embodiments, the content streaming processor module is further configured to provide a user interface to the user wearing the HMD to allow rating of the content presented by a mechanism of the HMD, rating of content publisher providing the content, and rating of other users interacting with the content. The rating is captured by the user rating module and forwarded to the dynamic rating generator module to generate or adjust the rating score for the content.

In some embodiments, the content filtering module is further configured to identify a component of the portion of the content that needs to be selectively filtered and to perform a selective overlay of the identified component of the portion of the content using appropriate component overlay identified for the component being selectively filtered. The appropriate component overlay is identified based on the user profile of the user.

In some embodiments, the content filtering module includes an image overlay modifier to selectively overlay an appropriate portion of a video, a text, or a graphic component of the portion of the content that is identified for selective filtering with a different video, text or graphic component that is appropriate for the user profile of the user, and a sound overlay modifier to identify and selectively overlay over an appropriate portion of an audio component of the portion of the content that is identified for selective filtering with a different audio component that is appropriate for the user profile of the user.

In another embodiment, a computer readable medium with computer executable instructions stored thereon is disclosed. The computer readable medium includes program instructions for identifying content for presenting in a rendering space defined by one or more mechanisms of a head mounted display (HMD) of a user. The content is interactive and dynamically changes based on actions or interactions of the user. The computer readable media further includes program instructions for identifying a rating score for the content, program instructions for dynamically adjusting the content to selectively filter a portion of the content based on the identified rating score and a user profile of the user, and program instructions for rendering the adjusted content via the HMD. The dynamic adjustment of the content is carried out during a session so that different portions of the content are selectively filtered based on changes in the content as determined by the actions or interactions of the user with the content presented in the rendering space.

The present invention thus fills the need by providing ways to control the content that is being presented by the mechanism(s) of the HMD by filtering the content based on the user profile just before the content is presented to the user wearing the HMD. The content may be user generated content or content provided by a third party. In some embodiments, a virtual world presented by the mechanism(s) of the HMD can be traveled, visited, and interacted with using a controller or controlling input device of a real-world computer user. In other embodiments, the user may interact with real-world scene provided in the rendering space to provide comments, or include virtual world objects, computer-generated graphics/content, etc., and such user interactions may result in the generation of augmented content that is rendered in the rendering space. Alternately, the real-world user wearing the HMD may, in essence, be playing a video game, in which he controls an avatar (e.g., virtual person/user) within the content of the virtual environment presented in the HMD. In this virtual environment, the real-world user may control the content by providing actions/interactions to move the avatar, interact with other avatars controlled by other users, post messages, provide graphics, etc., and the content and interactions (of the controlling user and of other users) presented in the virtual environment are filtered in accordance to the user profile of the controlling user.

In other embodiments, real-world users need not be controlling the avatars in the virtual environment being rendered on the rendering space. In such embodiments, the avatars shown in the virtual environment may be avatar bots, for example, that are controlled by a machine or an application executing on the machine. Avatar bots are configured to move around the virtual scene in a similar way as do the avatars that are controlled by a user. For example, the avatar bots are designed to interact in defined manners, modify the virtual environments, interact with other avatars and objects in the virtual environment, post advertising, post messages, build or destruct virtual spaces, virtual pieces, virtual objects, virtual buildings, etc. Even with the avatar bots, there might be instances where the content in the virtual environment are not appropriate for a user wearing the HMD. For example, the content may be too violent, too gruesome, etc. As a result, the content provided by the avatar bots are selectively filtered in accordance to the user profile so that only content that is appropriate for the user are presented.

In yet other embodiments, real-world users may control some of the avatars in the virtual environment space while other avatars shown in the virtual environment space may be bots controlled by a machine. In other embodiments, the user may be interacting with the content of an application or content obtained from a content provider. Irrespective of the source of content presented in the virtual environment, the content is filtered in accordance to the filtering rules established for the user profile of the user so only content that meets the user profile standard are rendered by the mechanism(s) of the HMD to the user.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

FIG. 3B illustrates the VR environment of FIG. 3A in which a sub-content (i.e., a portion of a content) is replaced with other sub-content based on user profile, in accordance with one embodiment of the present invention.

DETAILED DESCRIPTION

Figure 1A:
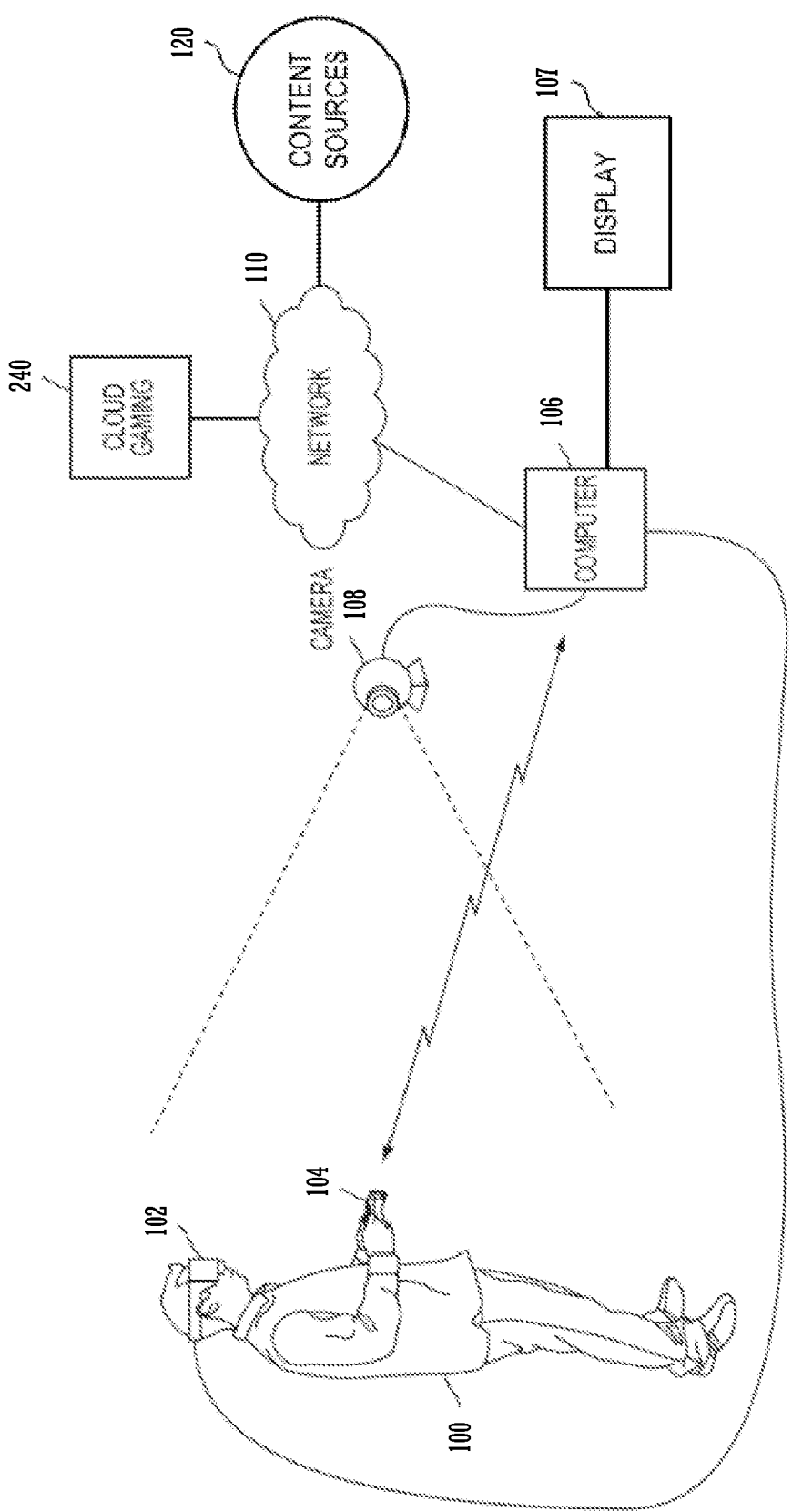
FIG. 1A illustrates a simplified block diagram of an interactive environment that provides content to the user wearing the HMD, in accordance with an embodiment of the present invention.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to obscure the present invention.

According to an embodiment of the present invention users may interact with content presented in a rendering space, such as a virtual reality (VR) space, an augmented reality space, etc., defined by one or more mechanisms of a head mounted display (HMD). The content presented in the VR space is selectively filtered in accordance to user profile of the user wearing the HMD so that the content presented is appropriate for the user. The content may be real-world content or virtual world content including augmented reality content, game content or any other content representing a real or fictitious environment, and obtained from any content source. The VR content may include interactive streaming content that a real user may interact with via one or more input devices and/or user interfaces. The rules of interaction with the VR content may be simulated by means of one or more processors In the case of simulation via plurality of processor modules, multiple processor modules may be linked together via a network. The user may interact with the virtual world via a user interface/input device that can communicate with the processor modules and other user interface devices via a network. Virtual world content presented to the user may include one or more components including audio component, video component, graphical component, textual component, etc. The graphical, textual, and video component may be presented through one or more visual mechanisms, such as a display screen, a projector, or other devices that direct light towards a part of the eye(s) of a user of the HMD and the audio component may be presented through an audio mechanism, for instance a speaker, bone conduction or other devices that produce audio waves. The aforementioned audio and visual mechanisms are exemplary and that other mechanisms may also be engaged by the HMD for presenting the content to the user.

The virtual world environment may include avatars representing distinct users or virtual objects that the users can interact with using input device or user interface. When a particular user interacts with the virtual world, the user may do so by interacting with an avatar or a virtual world object that is assigned, selected or associated with the user. The real or the virtual world environment presented in the rendering space may be presented from the point of view of the avatar or in relation to the avatar/object associated with the user wearing the HMD. The content may be presented in two-dimensional or three-dimensional image form. In some embodiments, an avatar of a user may interact with avatars of other users, with other virtual-world objects, or avatar bots controlled by machines. As mentioned earlier, avatar bots are similar to the avatars that are controlled by a real-world user.

The content presented in the rendering space is interactive, streaming content. As a result, as the user continues to select the content for viewing, the content is actively and dynamically filtered by a processor of a computing device that is providing the content to the HMD, in accordance to pre-defined filtering rules for the user profile of the user, before the streaming content is provided to the mechanisms of the HMD for rendering. The user profile of the user identifies privileges for viewing the content and, in some embodiments, user preferences specified by the user. The pre-defined filtering rules associated with the user profile provide the necessary checks to ensure that the content presented to the user meet the standard established for the user profile, even when the content is not owned by the user wearing the HMD. Additionally, the selective filtering in accordance to the user profile allows different users to view the same content differently based on the user profile that they are associated with, instead of providing a universally filtered content to all users. For example, a video provided to a child may be filtered to remove any adult or inappropriate content based on the child's user profile and the same video may be presented to an adult of a particular race, religion, demographic differently by applying appropriate filters in accordance to their user profile. Such filtering may allow keeping some of the content that was filtered out for one user while filtering some other content out for the other user. It should be noted herein that filtering of content, as used in this application, encompasses removing a selective portion of the content, modifying the selective portion of the content, overlaying the selective portion of the content with a different content, etc., that otherwise changes the appearance or rendering attribute or data content of the portion of the content so as to comply with the user profile of a user for whom the content is being rendered. The advantages of the invention will become apparent from the following detailed description of the various drawings.

FIG. 1A illustrates a system for rendering interactive content, such as content associated with gameplay of a video game, in accordance with an embodiment of the invention. A user 100 is shown wearing a head-mounted display (HMD) 102. The HMD 102 is a wearable device that can be worn in a manner similar to glasses, goggles, or a helmet, and is configured to display a video game or other content to the user 100 via images. The HMD 102 is configured to provide an immersive experience to the user by virtue of how the display mechanisms (e.g., optics and display screens) are disposed in relation to the user's eyes, or by virtue of how the one or more rendering mechanisms present the content to the user, and by the format of the content delivered to the HMD. In one example, the display mechanisms may include display regions in front of each of the user's eyes which occupy large portions or even the entirety of the field of view of the user. Alternately, the display regions may be presented in front or on a side of one eye of the user.

In one embodiment, the HMD 102 can be connected to a computer 106. The connection to computer 106 can be wired or wireless. The computer 106 can be any general or special purpose computer, including but not limited to, a gaming console, personal computer, laptop, tablet computer, mobile device, cellular phone, tablet, thin client, set-top box, media streaming device, etc. In some embodiments, the HMD 102 can connect directly to the internet, which may allow for cloud gaming or access to applications on the cloud without the need for a separate local computer. In such embodiments, the computer and computing resources for processing content retrieved from the Internet may be defined within the HMD itself. In one embodiment, the computer 106 can be configured to execute a video game (and other digital content), and the video and audio output from the video game is transmitted to the HMD 102 for rendering. The computer 106 is, in one example, a video game console.

The computer 106 may, in some embodiments, be a local or remote computer, and the computer may run emulation software. In a cloud gaming embodiment, the computer is remote and may be represented by a plurality of computing services that may be virtualized in data centers, wherein game systems/logic can be virtualized and distributed to user over a network.

The user 100 may operate an input device, such as a controller 104, to provide input for the video game. In one example, a camera 108 can be configured to capture image of the interactive environment in which the user 100 is located. These captured images can be analyzed to determine the relative location and movements of the user 100, relative position of the HMD 102 and the controller 104. In one embodiment, the controller 104 includes a light (or lights) or a detectable/trackable indicator which can be tracked to determine its location and orientation. Additionally, as described in further detail below, the HMD 102 may include one or more lights or detectable/trackable indicators which can be tracked as markers to determine the location and orientation of the HMD 102 during interaction, such as during game play, in substantial real-time.

The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In some embodiments, computer 106 can execute games locally on the processing hardware of the computer 106 and provide the content to the mechanisms of the HMD for presenting to the user. The games or content can be obtained in any form, such as physical media form (e.g., digital discs, tapes, cards, thumb drives, solid state chips or cards, etc.) or by way of download from the Internet, via network 110. In another embodiment, the computer 106 functions as a client device in communication over a network 110 with a cloud gaming provider 240. The cloud gaming provider 240 may maintain and execute the video game being played by the user 100. The computer 106 receives inputs from the HMD 102, the controller 104 and the camera 108, and transmits the same to the cloud gaming provider, which processes the inputs to affect the game state of the executing video game. The output from the executing video game, such as video data (i.e., sight related data), audio data (i.e., sound), and interactive feedback data, such as haptic feedback data, temperature data, texture change data, etc., is transmitted to the computer 106. The computer 106 may further process the data before transmission, but in some embodiments, may directly transmit the data to the relevant devices. For example, video and audio streams may be provided to the HMD 102, whereas a vibration feedback command, temperature data, and/or texture change data, may be provided to the controller 104.

In one embodiment, the HMD 102, controller 104, and camera 108, may themselves be networked devices that connect to the network 110 to communicate with the cloud gaming provider 112. For example, the computer 106 may be a local network device, such as a router, that does not otherwise perform video game processing, but facilitates passage of network traffic. The connections to the network 110 by the HMD 102, controller 104, and camera 108 may be wired or wireless. In some embodiments, content rendered on the HMD 102 and/or displayable on a display 107 or presented via the one or more mechanisms of the HMD 102, are streaming content that can be obtained from any content source 120. Example content sources can include, for instance, internet websites that provide downloadable content and/or streaming content. In some examples, the content can include any type of multimedia content, such as movies, games, static/dynamic content, pictures, social media content, social media websites, etc.

As will be described below in more detail, a player 100 may be playing a game using the HMD 102, where such content is immersive 3D interactive content. The content provided to the HMD 102, while the user (i.e., player 100) is playing, can be shared to a display 107. In some embodiments, the display 107 can be a display screen of a HMD. In other embodiments, the display 107 can be a display surface/space on which the content may be rendered by mechanisms of the HMD. In one embodiment, the content shared to the display 107 can allow other users proximate to the player 100 or remote to watch along during the user's play. In still further embodiments, another player viewing the game play of player 100 on the display 107 may participate interactively with player 100. For example, a user viewing the game play on the display 107 may also participate in the game play to control characters in the game scene, provide feedback, provide social interaction, and/or provide comments (via text, voice, actions, gestures, etc.,) enabling users that are not wearing the HMD 102 to socially interact with player 100, with the game play, or with the content being rendered via the mechanisms in the HMD 102.

Figure 1B:
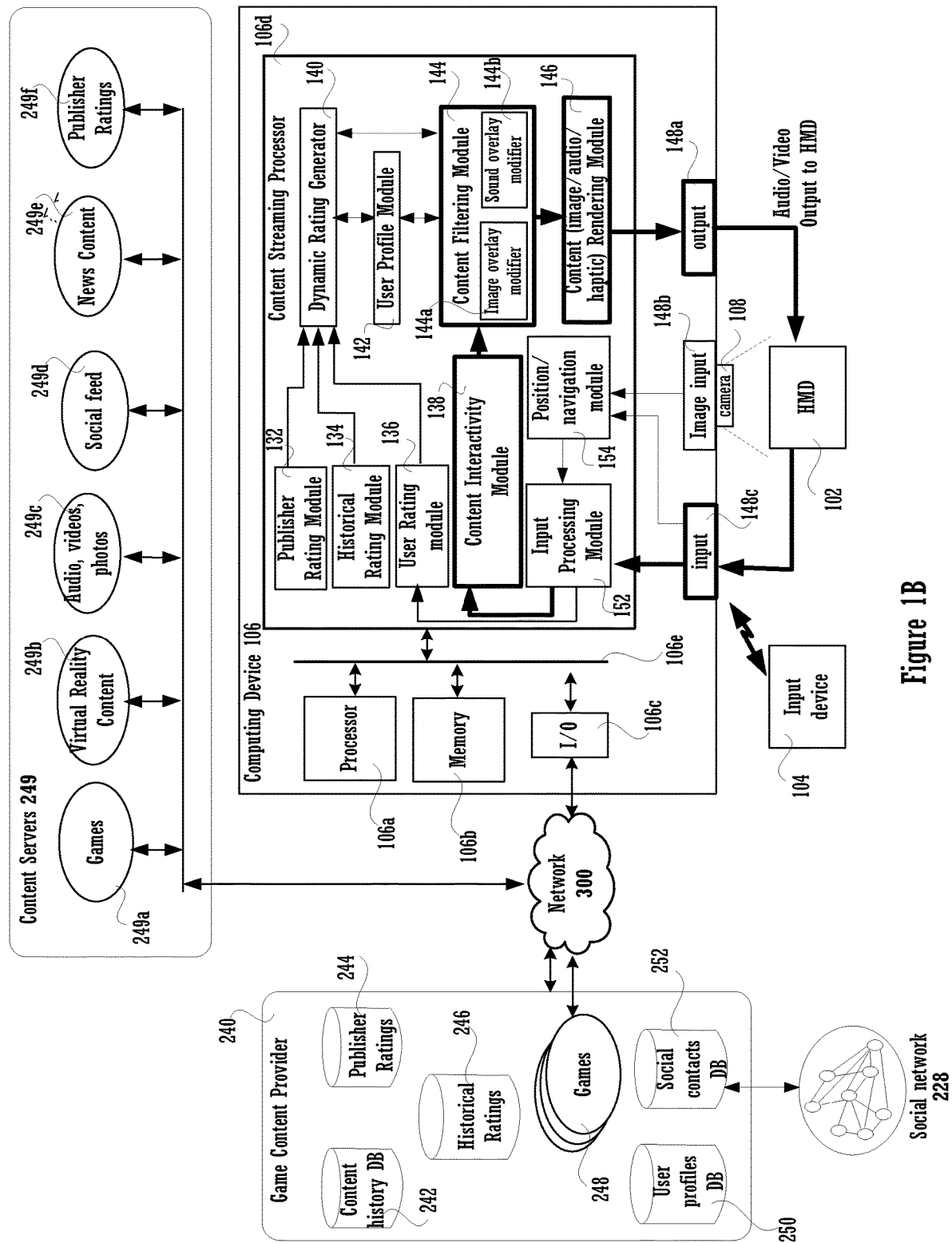
FIG. 1B illustrates various modules within an exemplary content streaming processor used to adjust content presented in a rendering space defined by one or more mechanisms of a HMD worn by a user, in accordance with an embodiment of the present invention.

FIG. 1B illustrates the various different sub-modules of a content streaming processor module provided on a computing device 106 that are used for adjusting the content presented via the HMD. The content streaming processor module 106d may be maintained in memory 106b and executed by a processor 106a of the computing device 106 or portion of the streaming processor module 106d may be maintained in memory while the remaining portion may be maintained on a cloud server. The content may be obtained from a content source or content publisher over a network 300, such as the Internet, or may be content generated by a user or may be content generated at the computing device, such as a game console, etc., and selected for streaming to the HMD via local area network, etc. In some embodiments, the content may be related to game play of a video game obtained from a game content provider 240 or from a remote game server 249a that is accessible over the network 300. In one embodiment, the game content provider 240 may be part of cloud gaming network accessed over the network. The computing device 106 may be connected to the game content provider or remote game server through wired or wireless connection. Interactions between the processor 106a, memory 106b, and the content streaming processor 106d are carried over an internal bus 106e. Request for content to the content source and receipt of content from the content source are carried out through the input/output (I/O) module 106c and transmitted to the content streaming processor module through the internal bus. The I/O module may include a network interface card (NIC) for receiving the content data in packets that is appropriate for the network protocol used. The data packets are processed and the content extracted. The extracted content is forwarded to the content streaming processor for further processing.

The content streaming processor module 106d may receive not only the requested content but may also receive one or more ratings for the content published by the content publisher, from one or more authorized rating sources and/or from one or more users. As mentioned earlier, the content streaming processor module may include a plurality of sub-modules used for receiving and filtering content in accordance to a user profile of a user wearing the HMD, before it is streamed to the HMD for rendering. Some of the exemplary sub-modules may include content filtering module 144, content interactivity module 138 and content rendering module 146. In addition to the aforementioned sub-modules, additional sub-modules may also be provided to process input data received from the user wearing the HMD to affect the content provided to the HMD. The additional modules for processing the input data may include input processing module 152, position/navigation module 154, a user profile module 142, and a dynamic rating generator module 140. The functions of each of the modules will now be described in detail with reference to FIG. 1B.

The content streaming processor 106d receives a request for content from the user wearing the HMD and retrieves the content from one or more content sources 249. The content could be of any format including game content 249a, virtual reality content 249b, audio, video, photos 249c, social feed 249d, news content 249e, publisher ratings 249f, or any other content that can be rendered using the mechanisms of the HMD. The content can be streaming content that dynamically changes either based on actions and interactions of the user detected at the content or based on the flow of data. The content may be cached in memory 106b and provided to the processor 106a through the internal bus 106e. In response to receiving the content from a content source, the content streaming processor 106d may be initiated. Once initiated, a content filtering module 144 within the content streaming processor may identify and analyze the content to determine the type and the context of the content.

Further, the content filtering module 144 may engage the dynamic rating generator module 140 to determine the rating of the content. The dynamic rating generator module 140 computes a rating score for the content and provides the same to the content filtering module 144 for determining the quality of the content and for identifying the necessary filtering rules, based on the user profile of the user, for applying to the content. In one embodiment, the dynamic rating generator module 140 retrieves the rating for the content from one or more sources and uses the accumulated rating to generate the rating score. In some embodiments, the rating provided by the different sources may be weighted differently by the dynamic rating generator module 140, which then computes the rating score in accordance to the weights associated with the various ratings received from the different sources. Specifically, the dynamic rating generator module 140 may retrieve publisher rating information provided by the publisher of the content using the publisher rating module 132, user rating information provided by the user of the HMD using the user rating module 136, rating information provided for the content by one or more of other users using the user rating module 136, and/or historical rating retrieved for the content from the historical ratings database 246 using the historical rating module 134. The other users may have provided the rating for the content either by interacting directly with the content or by interacting through social feeds and such rating may be maintained in the historical ratings database 246 and used for generating the rating score for the content. In the case where the rating is provided by the other users, the rating information may be retrieved along with the content from content publishers or may be retrieved separately from the respective users' social feeds.

It should be noted that in addition to the users' ratings, the historical ratings database 246 may also maintain rating information for the content provided by the publishers, relevant rating sources, and the user of the HMD when the content was requested and presented previously. The dynamic rating generator module 140 dynamically accumulates the rating information from the plurality of rating sources at the time the content is requested by the user of the HMD, and computes a rating score for the content in accordance to the weights accorded to each rating source. The rating score may, in some embodiments, be generated on-the-fly. The rating score may determine the quality of the content and be used during the filtering of the content by the content filtering module 144.

The content filtering module 144 may also interact with a user profile module 142 to determine the user profile of the user requesting the content. The user profile module is configured to determine the identity and one or more user attributes of the user wearing the HMD and use the user attributes to determine the user profile of the user from a user profiles database 250. The user profiles database 250 is a repository that maintains the user profile information of a plurality of users and user levels. The user profile information includes privileges accorded to the user for viewing the content and, in some embodiments, may also include one or more personal preferences of users. For example, the user preference may specify to include content provided or associated with specific ones of his/her social contacts, content that are provided by trusted sources, content that fit the demographics, etc., and such user preferences are maintained within the user profile of the user. When the content is retrieved from the content source and before the content is streamed to the HMD, the content filtering module retrieves the user profile of the user wearing the HMD to determine the privileges and preferences specified for the user and to identify the necessary pre-defined filtering rules for filtering the content.

The content filtering module 144 uses the user profile of the user and the rating score for the content to determine which one of the pre-defined filtering rules to apply to bring the content to the quality and standard that is appropriate for the user's profile. Once the filtering rules are identified for the user profile, the content filtering module 144 may analyze the portion of the content that is to be streamed to the HMD to determine if the content is in accordance to the filtering rules or if a particular sub-content needs to be filtered. A sub-content, as used in this application, is a portion of the content that is less than the whole content. The portion of the content may include a virtual object, a virtual avatar, a virtual graphic, etc., that is rendered in the VR space and/or viewed/interacted with using inputs from a user. The sub-content may include one or more components, such as an audio component, a video component, a text component, a graphic component, etc.

The content filtering module 144 analyzes the content that is to be presented to the user by the application, such as gaming application, as part of game progression, etc. The content filtering module determines the various components, such as speech/audio, text, image, etc., within the content, and may, in some embodiments, even perform image-to-text analysis to determine if the content meets the standard defined for the user profile of the user. Based on the analysis, the content filtering module 144 may identify a portion of the content or a component within the portion of the content that is not at the quality standard established for the user profile and may target it for filtering. For example, in a video content that includes a plurality of components, such as audio component, video component, graphical component and textual component, the content filtering module may identify a portion of an audio component of the content that does not meet the standard established for the user profile. In such case, the content filtering module 144 will identify the audio component portion to be filtered from the content. It should be noted that the audio component is one example and that other components may include inappropriate content and may need to be filtered. In some embodiments, more than one component may need to be filtered. As newer and newer content are streamed to the HMD, the analysis and filtering of the newer content are done in substantial real-time (i.e., on-the-fly) by the content filtering module before the content is presented to the HMD for rendering, thereby ensuring the content obtained from any content source adheres to the standard set for the user profile of the user. It should be noted that the analysis of the portions of the content is an on-going process as long as the user is engaged with the content and so long as newer content is being streamed to the HMD, and is performed in substantial real-time before the portions of the content are transmitted to the HMD for rendering.

In one embodiment, the portion of the content that is identified for filtering may be a component of sub-content within the content. Once the inappropriate component is filtered, the resulting filtered content meets the quality standard defined for the user profile of the user. In one embodiment wherein a component is selected for filtering, the content filtering module may replace the portion of the component with another component that matches the context of the content being streamed. In this embodiment, the content filtering module identifies different component content for the inappropriate portion of the component that needs to be filtered and replaces the inappropriate portion of the component by selectively overlaying with a portion of the identified different component content that is appropriate for the user profile of the user viewing the content. In some embodiments, the different component content is contextually related to the content. In some embodiments, when a different component cannot be found for replacing the inappropriate component content, a default component content may be identified for replacing the inappropriate content component. The default component may or may not be contextually related to the content. Depending on the component that needs to be filtered, the content filtering module may engage appropriate overlay module. For example, if an audio component needs to be replaced, the content filtering module 144 may engage the sound overlay modifier module 144b to replace the portion of the audio component that is inappropriate with an appropriate audio component that contextually relates to the content and is appropriate for the user profile of the user wearing the HMD. On the other hand, if a video, graphical or textual component needs to be replaced, then an image overlay modifier module 144a may be engaged by the content filtering module to overlay the appropriate portion of the video, graphical or textual component with corresponding component that contextually relates to the content and is appropriate for the user profile of the user wearing the HMD.

It should be noted that although the various embodiments have been described in detail with regards to filtering an audio or a video/graphical/textual sub-component, the current embodiments are not limited to just these sub-components. In some embodiments, the filtering mechanism provided within the content filtering module may be configured to filter content that are beyond the visual and audio sub-components. As a result, the filtering mechanism may include appropriate overlay modifier module(s) for selectively filtering a sub-component from a portion of content related to senses that are beyond sight and hearing. For example, in some embodiments, sub-component related to one or more senses, such as smell (including trigeminal sensation), touch (including pain, pressure, itch, temperature, texture, etc.), taste, vestibular, proprioception, etc., as well as sub-component related to some internal senses, such as hunger, nausea, thirst, etc., may also be selectively filtered using the appropriate sub-components of the filtering mechanism.

Once the content has been filtered, the filtered content is formatted by the content rendering module 146 in accordance to the requirements of the HMD. The filtered and formatted content is transmitted to the HMD through the output module 148a. The output module 148a may perform further processing in accordance to the communication protocol established between the computing device and the HMD and forward the processed content to the HMD for rendering.

In response to the rendering, the user may interact with the content through the HMD or via user actions at the input device, such as a controller, keyboard, mouse, etc. User interactions from the input device 104 and HMD 102 are received at the input module 148c and forwarded to the input processing module 152 of the content streaming processor 106d. The input processing module 152 analyzes the user input to determine the type of interaction and how the interaction affects the content. In some embodiments, the interaction may be content related rating provided by the user or rating of another user in response to the actions/interactions with the content provided by the other user. In this embodiment, the rating information may be forwarded to the user rating module 136 to affect the rating of the content. In another embodiment, the interaction may be actions provided by the user using the input device 104 that are used to affect the content being presented via the HMD 102. In this embodiment, the interaction may be forwarded to the content interactivity module 138. The content interactivity module 138 analyzes the interaction and determines which portion of the content needs to be adjusted based on the user interaction and adjusts the content accordingly. The adjusted content is forwarded to the content filtering module where the pre-defined rules for the user profile are applied to ensure that the adjusted content adheres to the standard defined for the user profile.

The user interaction received at the input module may include position data associated with the input device 104, such as the controller, etc., and/or navigation data provided through the input device 104. For example, the controls in the input device may be used to advance an avatar or an object associated with the user within the virtual scene of a game play presented using the mechanisms of the HMD 102, in a particular direction and such advances may require the game scene to be adjusted in accordance to the relative position of the avatar of the user. In addition to the user input received from the input device(s), the input may be provided through the HMD 102, as position and navigation data, for example. The input from the HMD 102 may be used to affect the content that is streamed to the HMD. The position and orientation of the HMD is captured through a camera 108 and forwarded through the image input module 148b to the position/navigation module 154 for further processing. The input data provided by the HMD is transmitted by the position/navigation module 154 and processed in a fashion similar to the input from the input device by the input processing module and forwarded to the content interactivity module 138 to affect the content streaming to the HMD.

In some embodiments, the position and navigation data captured from the HMD and/or the input device may be analyzed by the input processing module 152 to determine the relative location of the user and the relative position of the HMD, which can translate to the relative location of the user's avatar in the game scene. Based on the analysis, the input processing module 152 may determine the movement of the user and the relative direction of movement within the rendering space (for e.g., virtual reality (VR) space), such as the game scene during game play. The movement and direction information is provided to the content interactivity module 138 to affect the content. For example, the content may need to be adjusted to reflect the movement of the user in the VR space, based on the input provided by the user. The adjustment to the content, in the form of additional content in the direction of movement of the user in the VR space, is provided to the content filtering module 144 to allow the content filtering module 144 to selectively pre-screen/pre-filter the content in accordance to the user profile in anticipation that the user will continue to move in the direction determined by the user input. When the user moves in the direction determined by the user input, the pre-filtered content is ready to be presented to the user's HMD. In other words, the content is filtered ahead of time by determining the direction in which the user is moving currently, determining the direction of movement of the user based on the current direction of movement, determining the content that is to be rendered in the direction of movement, and pre-filtering the content in accordance to the user profile of the user in anticipation that the user will continue to move in the direction predicted by the analysis of the user input.

In some embodiments, the content streaming processor 106d may maintain the history of content presented to the user in response to the user's request. The history may include content that was requested, content that was filtered out and/or content that was replaced with other content. The content streaming processor 106d may periodically analyze the content in the user's history in accordance to the pre-defined filtering rules defined for the user profile of the user to ensure that the content that is being presented to the user meets the standard set for the user profile. The pre-defined filtering rules defined for the user profile encompass user demographics, user attributes, actions and interactions that can be detected at the content, context of the content, rating score of the content and sub-contents within the content, user preferences, or any two or more combinations thereof. Thus, during the analysis, the content streaming processor may identify a particular sub-content of the content that was presented in the VR space with context that was similar to the context of a sub-content that was selectively filtered. For example, a portion of an audio component of a sub-content with language that was inappropriate for the user profile of the user may have been filtered out in the content. However, audio component of another sub-content within the same content having language that was similar in scope to the audio component that was filtered out may have passed through the content filtering module and presented for rendering. This may be due to the fact that the pre-defined filtering rules may not have been sufficiently defined to identify all of the offensive or inappropriate language, lyrics, sound bites, or any other audio rendered in the content, for example. Also, some of the audio component may be offensive to certain users (for e.g., users of certain demographics) but may not be offensive to other users. Similar issues may arise with video, graphical, textual, or other components of the content. In order to intelligently filter and to avoid providing content that may be offensive to the user, the content streaming processor may provide an option to update the pre-defined filtering rules defined for the user profile so that the content presented during future rendition can be appropriately filtered to not include the sub-content/content that is inappropriate for the user profile of the user. The option, in one embodiment, may be provided in the form of a user interface to allow updating of the pre-defined filtering rules and/or to add additional filtering rules for the user profile.

In some embodiments, the content streaming processor 106d may also provide an option to update the user profile of a user. The user profile may be a profile associated with generic users based on certain user attributes, such as their age, religious beliefs, community membership, etc., or it could be more specific. Consequently, the updates to the user profile may include options to include additional user attributes and/or user preferences that are used to define more filters for the content presented to the user. In some embodiments, in addition to providing options to update user profile and the pre-defined filtering rules, the content streaming processor 106d may also provide option to allow rating of the content streamed to the HMD, rating of other users based on their user attributes or based on their actions/interactions at the content, rating of the content publisher, and any other content related ratings. The rating provided by the user is analyzed by the user rating module 136 and presented to the dynamic rating generator module 140 to affect the rating score of the content.

It should be noted that content may be received from various content sources, such as game content from game content providers 240 or other users 249a, real-world content captured and provided as video, audio/video/photo content 249c shared by other users who are either social contacts of the user or are reliable sources, news content 249e from news content providers, social feeds 249d from one or more social media, etc., analyzed according to the user profile of a user, and selectively filtered based on the pre-defined filtering rules defined for the user profile. The filtered content meets the viewing standard established for the user profile, allowing the user to view the content that is pleasant and appropriate.

The various embodiments describe a content streaming processor that maintains a bubble or environment around a user. The content streaming processor will view the content provided in the environment and will determine when to apply filters to content based on users actions and interactions within the rendering space in which the content is presented. For example, if sub-content, such as a virtual object, an avatar, etc., approaches or moves toward the user in the rendering space or if the user moves toward the sub-content in the rendering space, the sub-content can be changed, modified or even be replaced with filter appropriate sub-content, if the sub-content does not meet the standards established for the user profile of the user. In some embodiments, the sub-content may simply not be rendered, making it appear that the overall content did not even include the inappropriate sub-content (i.e., no sub-content cleaning occurred). As mentioned, the filters used on the content may include audio filters, image filters to filter different people that the user interacted with/not interacted with, image filters to filter different objects/graphics out, etc. For example, if some people in a social game play rendered via the HMD tend to provide an action that is too "adult" in nature, these people can be filtered out of the content ahead of time, based on the user profile of the user for whom the content is being presented. Alternately, they may be replaced with other people or virtual objects to make the content appear more realistic.

In some embodiments, the content may be filtered so that the content presented in the filter bubble/environment only includes content that is associated with a list of approved friends or social contacts or those that are viewed as trusted. In some embodiments, the content streaming processor 106*d* may identify the approved friends or social contacts of a user by interacting with a social contacts database 252. The social contacts database 252 analyzes the data provided by one or more social graphs and determines the relationship of the different social contacts identified therein with the user wearing the HMD, to identify the social contacts of the user. Even when the content is associated with friends/social contacts/trusted users, the content may still be dynamically filtered before presenting to the user on their HMD to ensure that the streaming content does not include actions/content provided by these sources that violate higher level controls, such as parental controls, etc., or user filters defined by the filtering rules for the user profile of the user. In some cases, people are known to make inappropriate gestures or utter inappropriate language when interacting with the content in the VR space. For such users, their hands that are making the inappropriate gestures may be excluded from rendering in the VR space or may be replaced with a generic hand gesture that is appropriate for the user profile and as viewed from the perspective of the controlled user. Similarly, the portion of the audio content that includes the inappropriate language may be replaced with a portion that includes appropriate language. Replacement of a portion of a component of a sub-content may be by overlaying the portion with a relevant portion of the component that is appropriate for the user profile.

In some embodiments, a reverse filtering can be performed on the content. For example, a parent may prefer not to play in an environment with a child having a high-pitched voice. In this example, the content presented in the environment may be appropriate for the parent. The user profile of the parent may include the necessary filtering rule to exclude the child with the high-pitched voice from the environment or, depending on the users interacting in the environment, exclude the environment in which a child with high-pitched voice is interacting or may define a rule for providing appropriate voice filtering to convert the tone of the high-pitched voice to a low-pitched voice before the content is rendered to the user. In these embodiments, not interacting in an environment where a user with a high-pitched voice or monotone voice is interacting, is a personal choice/preference of the user. The various embodiments allow a user to specify their personal preferences in the user profile so as to generate appropriate filtering rules for the content presented in the virtual environment via the HMD to make the content viewing experience a pleasant one for the user.

Figure 2:
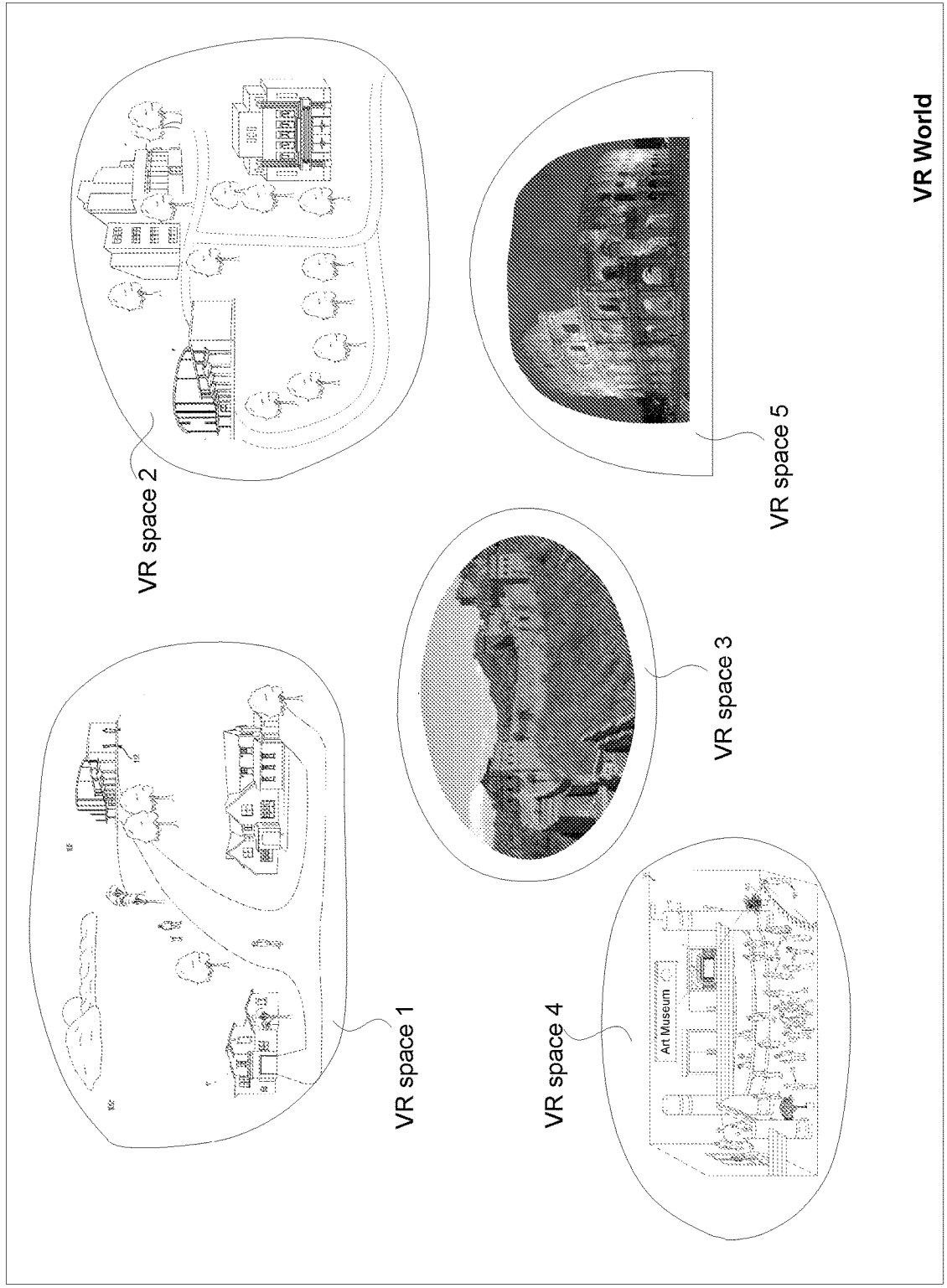
FIG. 2 illustrates an exemplary conceptual virtual space identifying different virtual reality (VR) environment that real-world users can navigate to, wherein the presented content is controlled, in accordance with one embodiment of the present invention.

With the detailed overview of the various embodiments, specific embodiments will now be described with reference to FIGS. 2-4. FIG. 2 illustrates a graphic diagram of conceptual virtual spaces that can be rendered using one or more mechanisms of the HMD 102 of a user 100, in accordance to one embodiment of the invention. In one embodiment, the user may be provided with different virtual (VR) spaces that the user can navigate to for viewing/interacting with the content. The VR spaces identified in FIG. 2 may be content that the user has navigated to, been provided access to, has subscribed to, is interested in viewing/interacting, or is recommended for the user based on the user attributes, preferences, geo location, social/business/personal connections, etc. In this embodiment, the virtual spaces are provided in graphical form for user selection at a user interface presented on a display screen of the HMD or in a rendering space defined by the mechanisms of the HMD, as illustrated in FIG. 2, or may be provided as a list from which the user can select. In an alternate embodiment, the user may be presented with content from any one of the VR spaces that is available to the user for viewing based on user request. The content for the VR space may include content from real-world environment or from a virtual-world environment or may be augmented content where real-world environment is overlaid with virtual-world content, computer-generated and/or, in some instances, user-generated graphics content. For example, the user may move around from one geo location to another and the content presented by the mechanisms of the HMD may be adjusted to provide the image of a real-world scene that is related to the geo location desired by the user. Alternately, the user may show interest in viewing different types of content at different times and based on the user's interest either content from different real-world scene or content from virtual world scene may be presented via the HMD. Based on the user selection, the content may be retrieved from appropriate content source and streamed to the HMD after the content is filtered and formatted. The user may interact with the content presented by the mechanisms of the HMD 102 using input device, such as a controller 104, and such interactions may be used to affect the content streamed to the HMD.

Figure 3A:
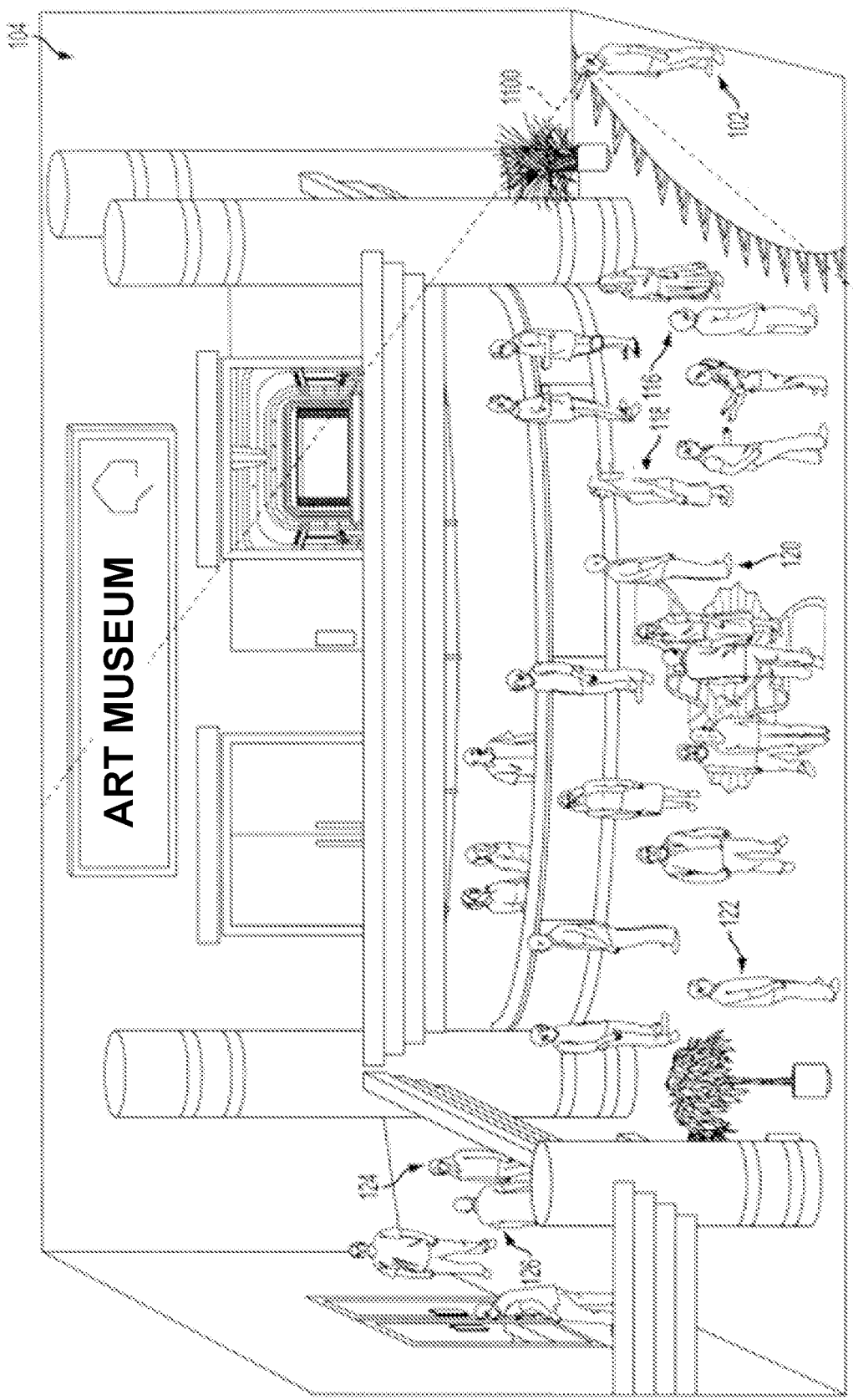
FIG. 3A illustrates an exemplary VR environment that a user navigates to for viewing or interacting, in accordance with one embodiment of the present invention.

FIG. 3A illustrates a graphic representation of a conceptual virtual space, such as an art museum (represented as VR space 4 in FIG. 2) wherein a plurality of user controlled or machine controlled avatars have congregated and are interacting with one another. As shown in FIG. 3A, the conceptual VR space is shown from the field of view of user 100 and includes the users interacting with one another, roaming the virtual space, having conversations with other users' through the respective avatars, etc. The content presented in the VR space may be from an interactive game or may be from a real world or any other virtual world scene. The content presented in the embodiment illustrated in FIG. 3A includes a plurality of avatars either controlled by other users interacting with the content or controlled by the machine. The content filtering module may, based on the user profile associated with user 100, identify one or more of the users avatars (for e.g., avatars 118 and 116) that the controlling user is not interested in interacting with in the virtual space. As mentioned earlier, the user profile identifies the user attributes of the controlling user as well as any individual preferences defined by the controlling user. Appropriate filtering rules for the user profile are identified and applied to the content, such that the resulting filtered content adheres to the content quality standard established for the user profile. In some embodiments, the content filtering module may apply the filtering rules to identify and filter other users avatars presented in the content within the VR space, based on the other users rating, nature and type of actions/interactions (both historical and current actions/interactions), reputation, relationship or lack of relationship with the controlling user, etc. Alternately, specific components of sub-content (for example audio component, video component, graphic component, etc.) associated with the other users may be filtered in accordance to the filtering rules of the user and the filtered content presented to the user via the HMD. The user profile of the user identifies the filtering criteria specified for the controlling user and the content filtering module filters the content accordingly.

FIG. 3B illustrates the graphic representation of the conceptual virtual space presented in FIG. 3A with one or more sub-content replaced with other content that is contextually related to the content, in accordance to the filtering rules defined for the user profile of the controlling user 100. In another embodiment, the pre-defined filtering rules may identify user preferences of the controlling user or a minimal threshold user rating required for other users in order for the controlling user to interact with the content associated with those users in the VR space. The aforementioned criteria are exemplary for defining the filtering rules used for filtering the streaming content and that other criteria may also be used. It should be noted that the filtering rules are not just defined to filter the avatars controlled or associated with other users but may be used to identify any other sub-content including virtual objects, graphics, text, etc., or specific components of the sub-content that needs to be filtered. Thus, as shown in FIG. 3B, depending on the user rating or user preferences, the two users 116 and 118 identified within the VR space of FIG. 3A are filtered and are seamlessly replaced with other users or groups of users (represented by 116a and 118a) that the controlling user may interact with, in one embodiment. In some embodiments, it is not necessary that the filtering needs to be done to replace a type of sub-content with sub-content of similar type. For example, in above example illustrated in FIG. 3B, the two users 116 and 118 may be replaced with inanimate or animate objects, such as a vase, a statue, a dog, a horse, etc., that are contextually appropriate for the content being rendered. Similarly, other sub-content or components of sub-content may be replaced by simply overlaying the portion of the sub-content or portion of the component of the sub-content that needs to be filtered with contextually relevant sub-content that is appropriate for the user profile.

In some embodiments, the content presented within the VR space may be improved by including contextually relevant content that is appropriate for the user profile of the controlling user 100 wearing the HMD. In such embodiments, if the content that is streaming is boring or does not have enough actions/graphics, the content filtering module may identify contextually relevant sub-content, such as graphics, animation clips, audio clip, video clip, etc., and intelligently merge it with the content to make the content more interesting and/or pleasing. Of course, the identified sub-content is analyzed to ensure that the sub-content meets the filtering rules defined by the user profile of the controlling user.

Figure 3C:
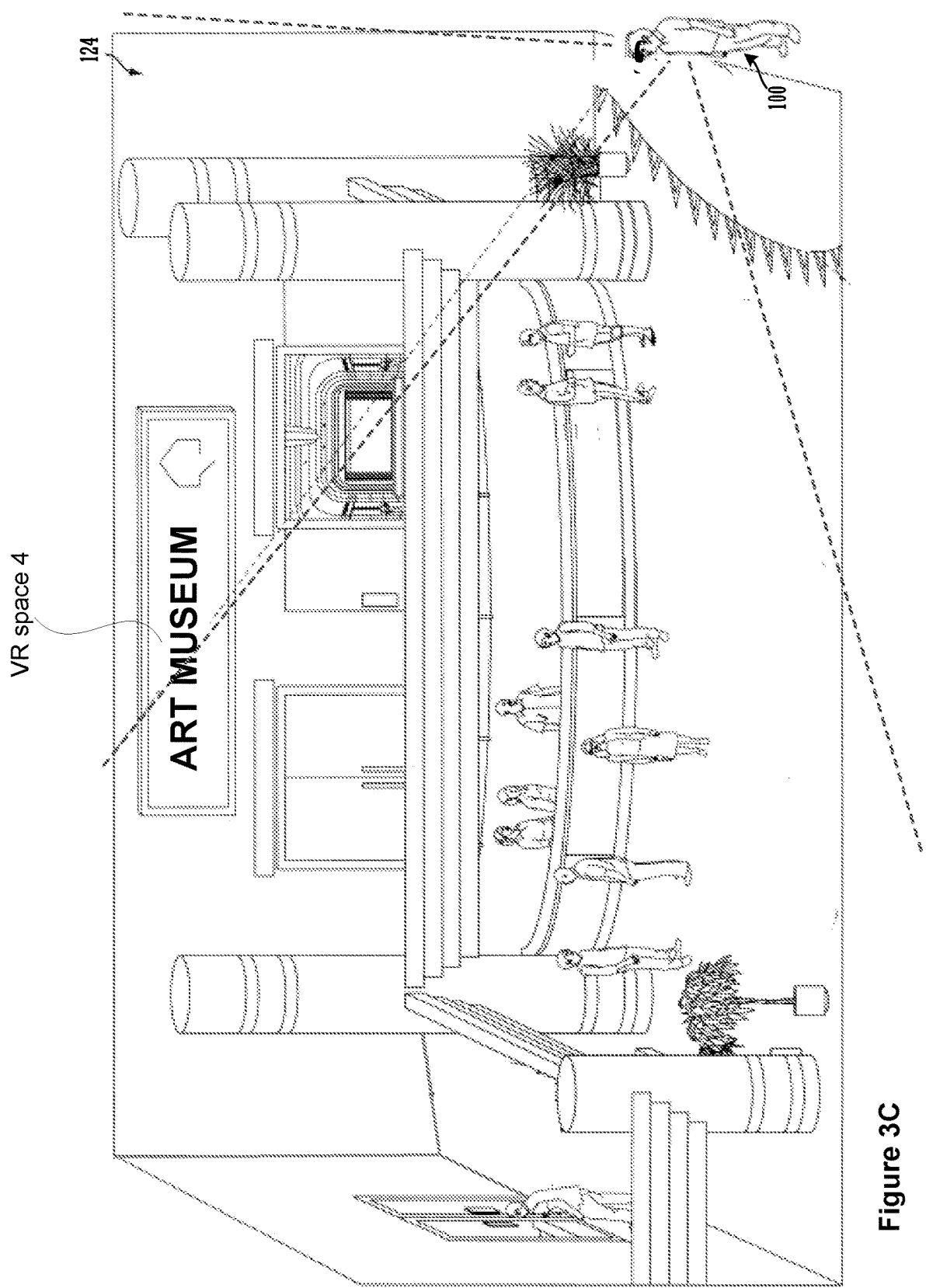
FIG. 3C illustrates the VR environment of FIG. 3A from which sub-content has been filtered out, in accordance with one embodiment of the present invention.

FIG. 3C illustrates a graphic representation of the content in the conceptual VR space presented in FIG. 3A with some of the sub-content simply filtered out, in accordance to the filtering rules defined for the user profile of the controlling user 100. For example, the controlling user 100 may specify that he would like to only view content provided or controlled by other users that are his social contacts or users that are reliable or reputable. As a result, the content filtering module filters out the avatars handled by other users that are not reliable/reputable or are not the controlling user's social contacts, as illustrated in the VR space 4 depicted in FIG. 3C.

Figure 3D:
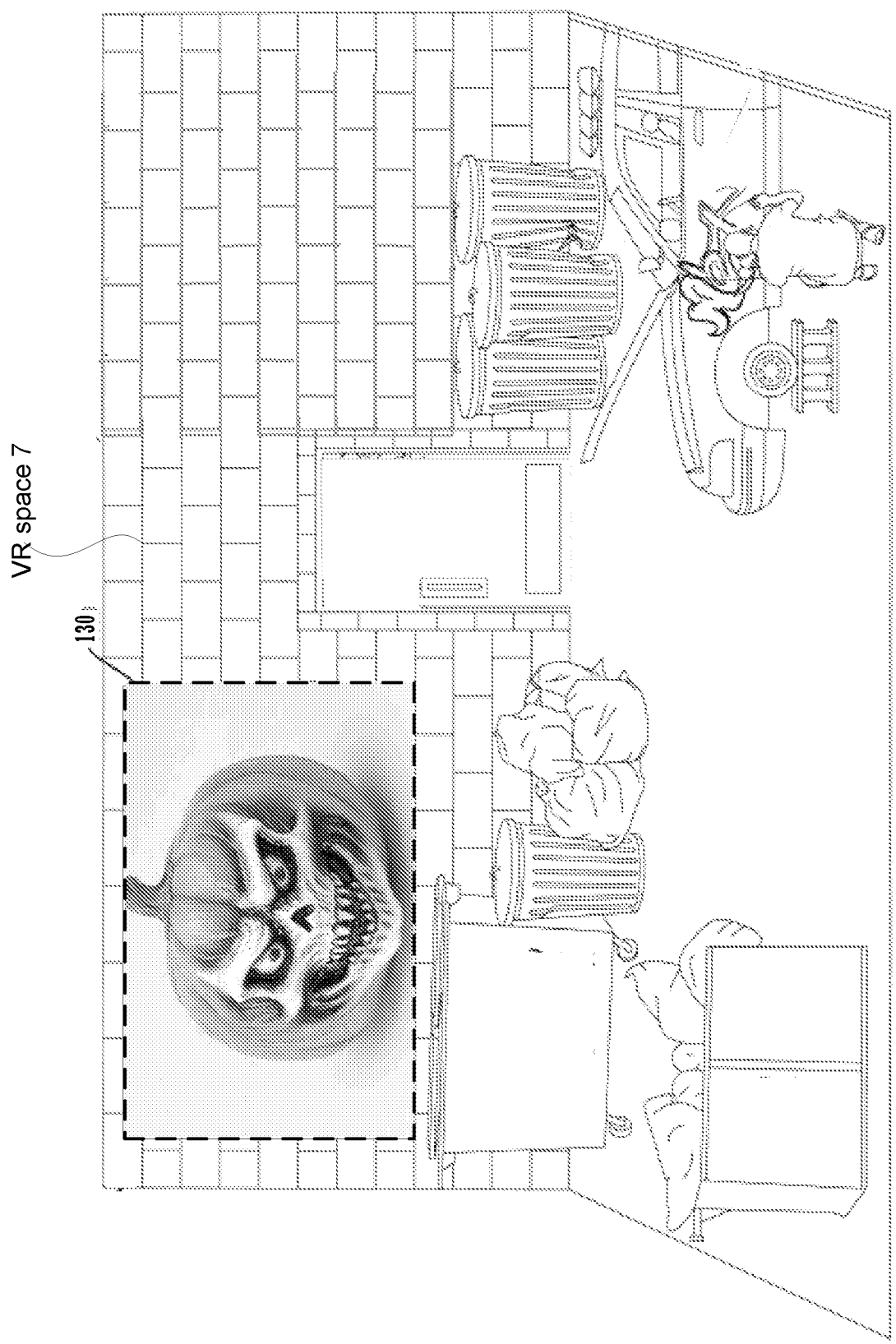
FIGS. 3D and 3E illustrate a before and after view of a VR environment from which a sub-content has been filtered and replaced with an alternate sub-content that is appropriate for a user, in accordance to an embodiment of the invention.
Figure 3E:
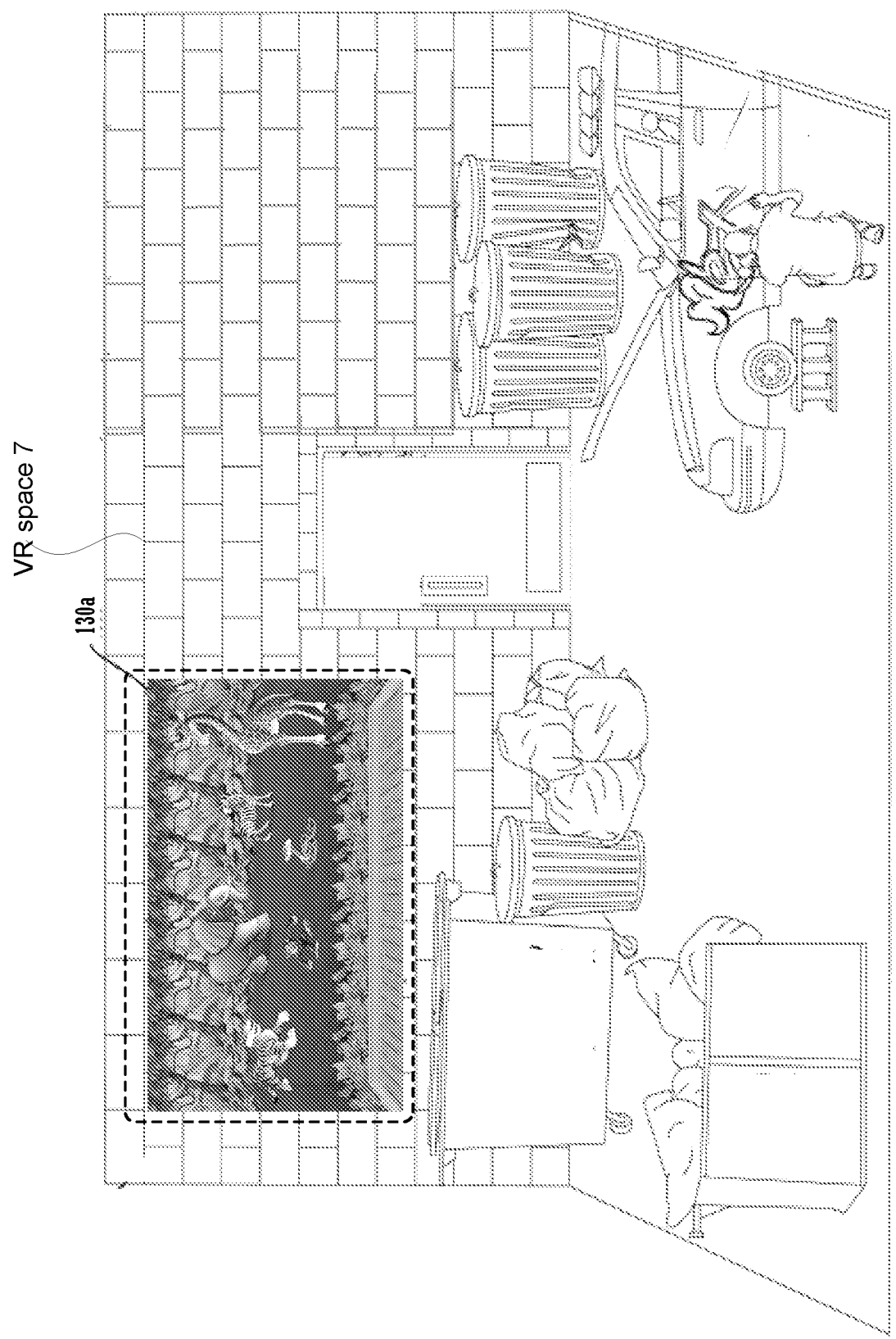

FIG. 3D illustrates an interactive space which may be part of a building in the conceptual virtual space environment, in accordance to an embodiment of the invention. As illustrated, a wall of the building may have graffiti or graphic 181 that, in accordance to the user profile of the controlling user, may be offensive, scary, gruesome or otherwise inappropriate for the controlling user. As a result, the content filtering module will identify the offensive or inappropriate sub-content (i.e., graffiti or graphic) and either filter it out or replace it with a different sub-content of the same type (i.e., graphic) that is identified to be appropriate for the user. For replacing the content, the content filtering module may search a repository of content maintained in a content history database to identify the type of sub-content that are contextually appropriate and match the rendering criteria defined for the user profile and replace the inappropriate sub-content with the identified sub-content. Alternately, the content filtering module may identify content by searching the Internet and replace the inappropriate content with the content from the Internet. The replacement of the sub-content may include re-sizing or re-formatting the identified sub-content to fit the virtual space or portion of the content where it is being replaced. FIG. 3E illustrates one such example wherein the offending graphic 130 in VR space 7 illustrated in FIG. 3D is replaced with a different graphic 130a that meets the standard established for the user profile of the controlling user. The filtering of content may be tailored to meet the user profile requirements of different users. As a result, in some embodiments, different users may see different graphics based on their respective user profile. For example, if the controlling user is a child, then the replaced graphic may be a cartoon graphic that is appropriate for the user's age and other attributes, as illustrated in FIG. 3E. If the controlling user is a young adult, the replaced graphic may be an advertisement for a video game, for example, and so on. Thus, different controlling users may be provided with content that matches their privileges and/or preferences, making this a very pleasant content viewing and interactive experience for the user.

Figure 4A:
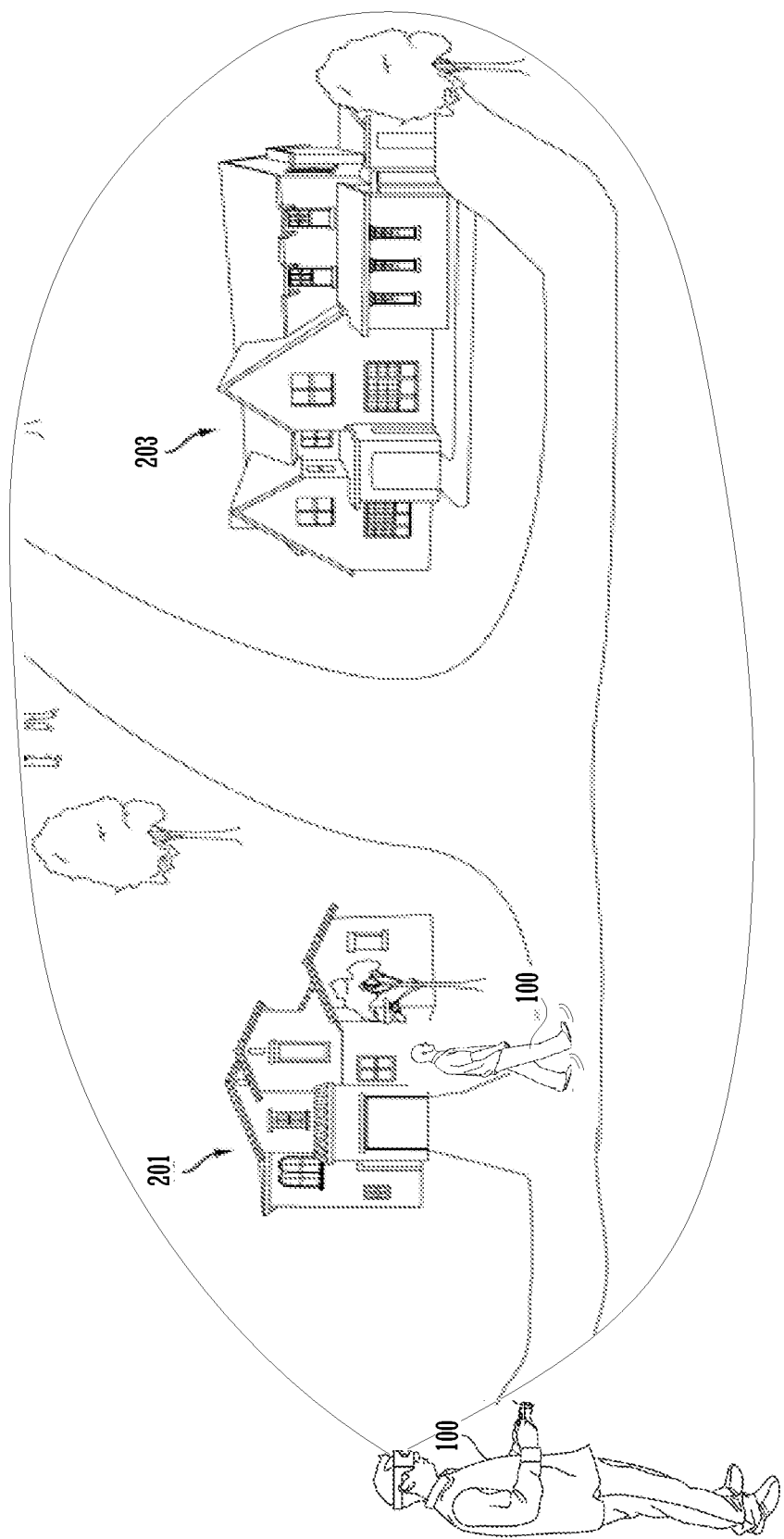
FIG. 4A illustrates an exemplary VR environment view based on a user's location within the VR environment, in accordance with one embodiment of the present invention.
Figure 4B:
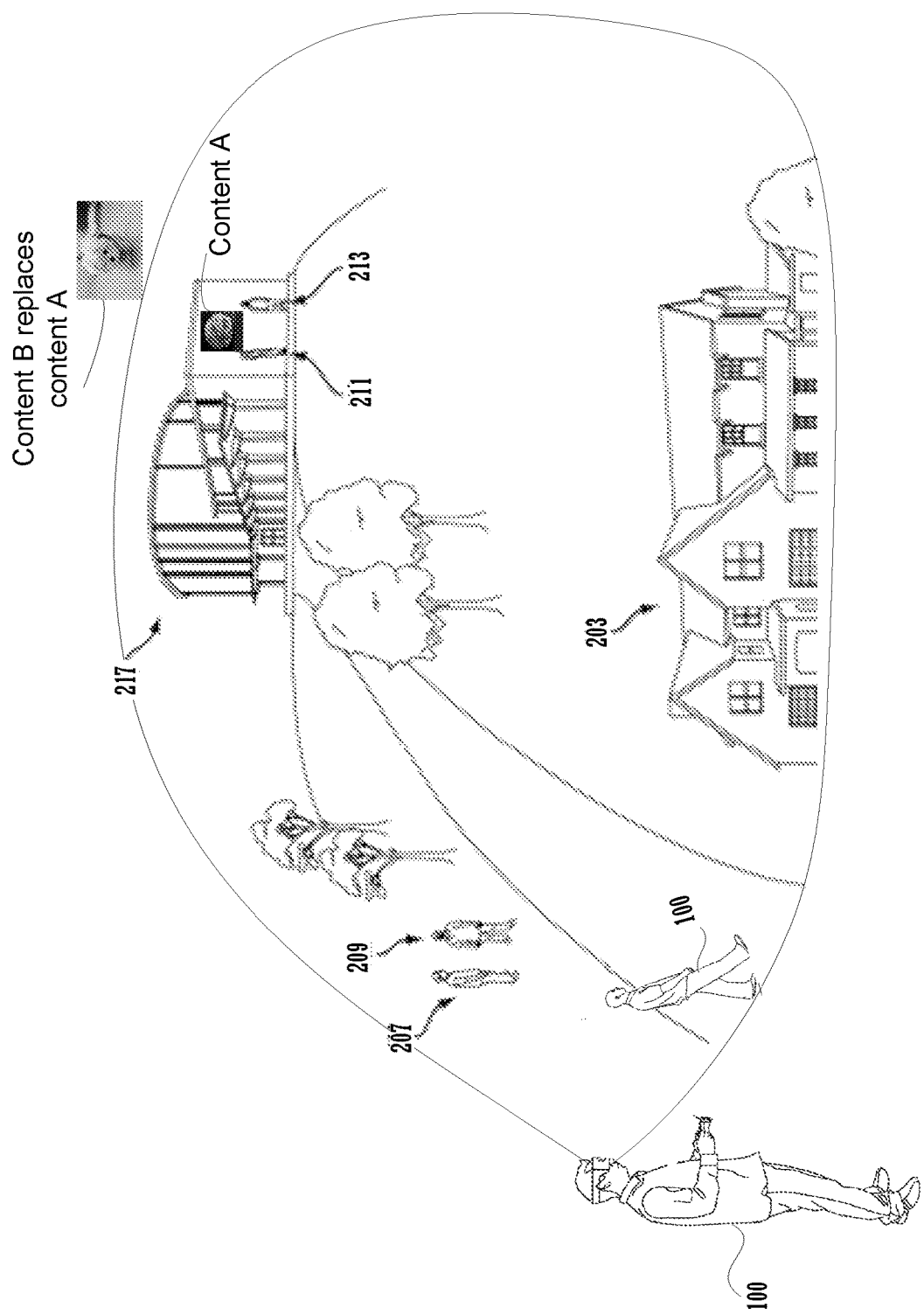
FIG. 4B illustrates the VR environment of FIG. 4A that has been adjusted based on user's movement in which a sub-content is filtered and replaced with an alternate content, in accordance with one embodiment of the present invention.

FIGS. 4A and 4B illustrate the virtual space rendering detail of a virtual world scene at different times, wherein the user 102 is shown to be moving around and interacting with other users, objects, or communicating with other users/objects, in accordance with an embodiment of the invention. The scene provided via the HMD reflects a view as perceived by user 100. As illustrated, user A 100 may have a home 201 in which user A 100 may enter, interact with objects, meet other users, exchange opinions, or simply define as a home base for user A 100. User A 100 may travel within the virtual space. For example user A 100 may walk around the virtual space 100b past certain buildings, houses, objects, enter into or out of different spaces, etc.

For example, user A 100 may walk over to user B's home 203 or take a walk along the street shown between user A's 100 house 201 and user B's house 203. As the user A 100 progresses along a path, the content is adjusted to reflect the user A 100's perspective view of the virtual scene. FIG. 4B illustrates one such embodiment, wherein user A 100 takes a stroll along the path between the two houses and past two users (207,209), chatting on the wayside and toward a meeting place 217 where two other users (211, 213) are standing and chatting on the side of the meeting place building. The other users (207, 209, 211, 213) depicted in FIG. 4B may be controlled by other real-world users or may be provided by an application, such as gaming application, providing the content or may be provided and controlled by the computer. The virtual space shown in FIG. 4B also includes other objects, such as trees, shrubs, and other aesthetic and interactive features to allow the various users to roam around or simply interact within virtual space. In one embodiment, the virtual space presented in FIG. 4B may include a graffiti or graphic (for e.g., content A) that may be inappropriate to user A 100, based on his/her user profile. The content filtering module may determine the actions/interactions provided by user A 100 through the HMD and input device, determine the movement and direction of movement of the user, identify the content that is to be presented in the direction of movement and analyze the content in accordance to user profile associated with user A 100 to determine if any sub-content or component of the sub-content within the content is to be filtered. Based on the analysis, the content filtering module may identify sub-content A that is presented on the side of the meeting place building 217 that is inappropriate for presenting to the user A 100. As a result, the content filtering module queries a content history database or the internet, for example, to identify a sub-content (content B) that is contextually relevant to the content and replaces the content A with content B before presenting the content to user A 100. The content filtering module performs the predictive analysis of content by anticipating the next interaction of the controlling user, analyzes and filters content in the direction of the anticipated move ahead of time so that the content is presented in the VR space in a seamless manner without much latency.

Figure 5:
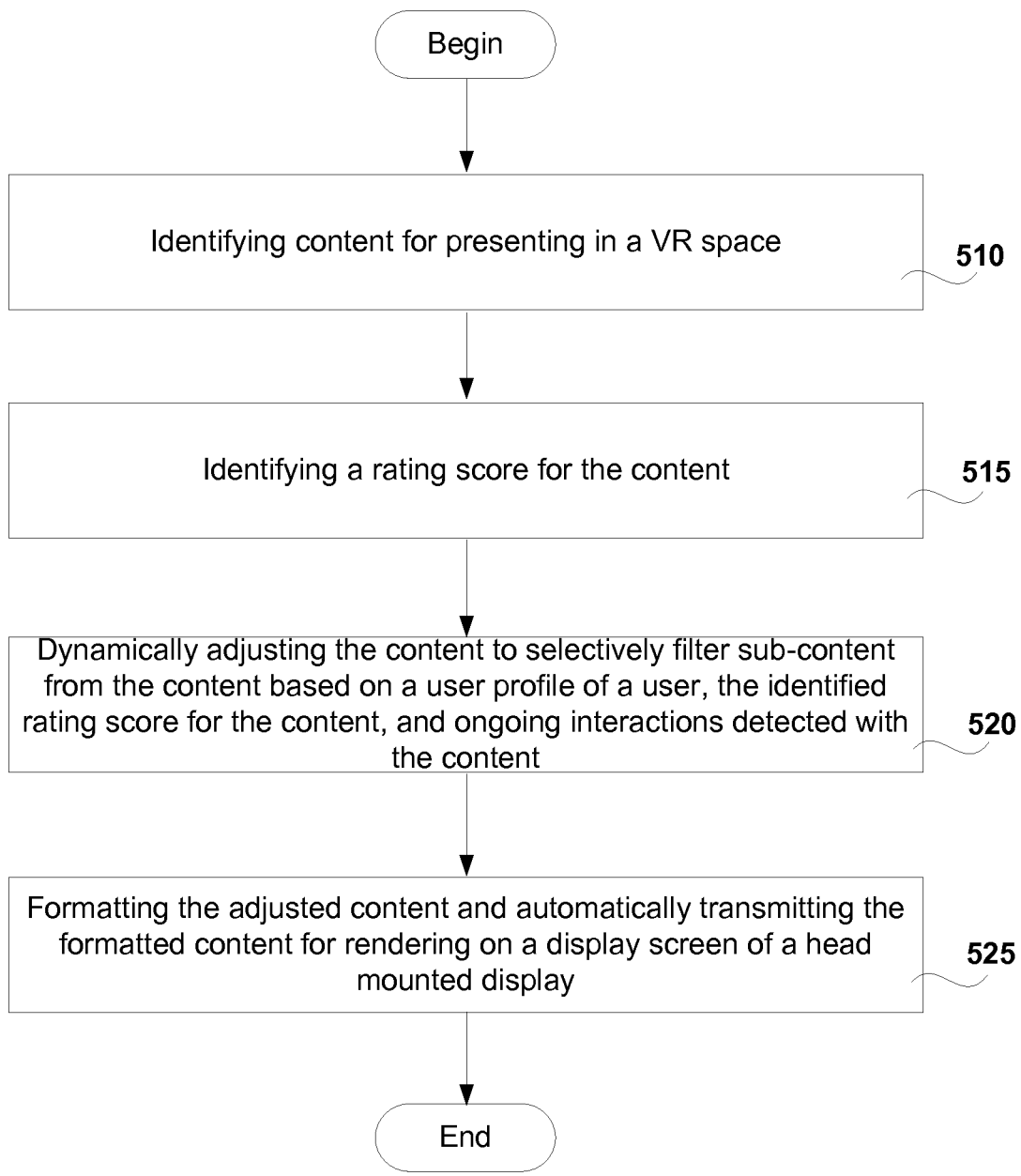
FIG. 5 illustrates process operations for controlling content that is presented in a rendering space for a user, in accordance with one embodiment of the present invention.

With the various embodiments of the invention described in detail, a method for filtering content in accordance to user profile of a user will now be described with reference to the method operations defined in FIG. 5. The method begins at operation 510, wherein content for presenting in a rendering (VR) space, is identified. A request for the content is made by a user wearing a head mounted display (HMD). The content is interactive streaming content and may be obtained from any content source. The content could be obtained from a gaming application executing locally or remotely, news content provider, social media, etc., and may include one or more components, such as audio, video, graphics, text, etc. The content may also include rating information related to the content provided by content provider, authorized rating sources, other users that have interacted or viewed the content, and/or rating information related to users providing the content as well users that interact with the content. A content source is identified and the content is requested and received from the content source. The received content may be stored in memory, such as cache memory, and processed by the processor of the computing device that is communicatively connected to the HMD.

A rating score is identified for the content, as illustrated in operation 515. The rating score may be generated by a dynamic rating generator module within content streaming processor by accumulating the rating for the content from various sources and computing the rating score. The dynamic rating generator module may weigh the rating obtained from different sources differently and the rating score may be generated, in one embodiment, as a function of the accumulated rating from each source and the weight assigned for the respective source.

The content is then adjusted to selectively filter a sub-content from the content, as illustrated in operation 520. The sub-content may be selectively filtered based on user profile associated with the user requesting the content, rating score of the content, and ongoing interactions detected at the content. As the content is streaming content, changes to the content may be caused by streaming flow of data. Additionally, other users may be interacting with the content and providing actions/interactions at the content and such ongoing interactions may provide changes to the streaming content. The actions and interactions from other users may include rating of the content, rating of user(s), and other actions that may affect the content streaming to the HMD. The actions and interactions are analyzed in accordance to the user profile associated with the user of the HMD to determine if the changes to the content meet the quality defined for the user or if the actions/interactions require the content to be filtered. Based on the analysis, when the content includes a sub-content that is inappropriate for the user profile, the content is selectively filtered by the content filtering module. The filtering may be performed in a manner to make the changes to the content appear seamless. In some embodiments, the inappropriate sub-content is removed. In other embodiments, the inappropriate sub-content is replaced with another sub-content that is contextually related to the content that is being streamed to the HMD. The replacing may be done by determining one or more parameters of a component of the sub-content and intelligently overlaying the component of the sub-content with another sub-content that is of the same type as the filtered sub-content. The replacing may include dynamically re-sizing or reformatting the other sub-content to match the parameters of the component that is being replaced so that the replacement appears seamless.

After dynamically adjusting the content, the content is formatted for rendering on a rendering space defined by the mechanisms of the HMD, as illustrated in operation 525. The formatted content is automatically transmitted to the HMD for presenting on a rendering space defined by the mechanisms of the HMD. The rendered content adheres to the standard established for the user profile of the user wearing the HMD.

The user may interact with the content through the HMD or through an input device, such as a controller. Additionally, image of the user wearing the HMD, image of the HMD and the input device are captured by a camera external to the HMD and the captured image is processed by a position/navigation module to determine the relative position of the user, relative position of the HMD, relative location of the input device, etc. Further, the input provided through the HMD and the input device is processed by an input processing module to determine the movement and direction of the user within the VR environment. The information provided by the position/navigation module and the input processing module is used by the content interactivity module to perform predictive analysis with regards to the direction of movement of the user within the VR environment and to pre-process the content in anticipation that the user will continue movement in the direction indicated by the position/navigation module and the input processing module. For example, if the content interactivity module determines that the user is moving in a south-easterly direction and will continue to move in that direction, then the content interactivity module may identify the content that is to be presented in that direction, pre-analyze the content and perform any filtering in anticipation that the user will continue moving in the direction. The process of receiving content and filtering the content in accordance to the user profile of the user wearing the HMD continues so long as the user is engaged with the content.

Figure 6:
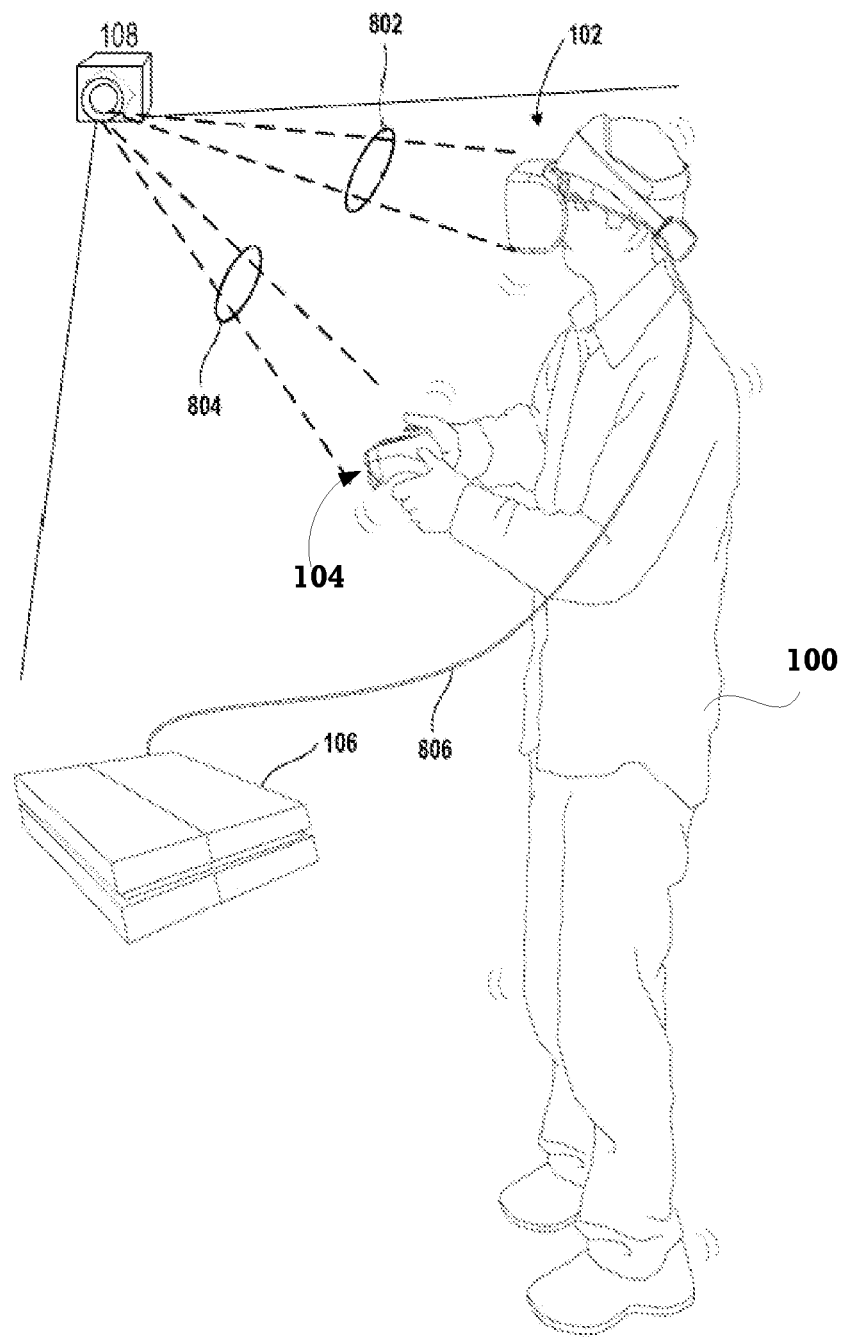
FIG. 6 illustrates an exemplary system in which a user wearing the HMD operates, in accordance to an embodiment of the invention.

FIG. 6 illustrates a user wearing the HMD 102, during use, in accordance with one embodiment. In this example, it is shown that the HMD is tracked 802 using image data obtained from captured video frames by the camera 108. Additionally, it is shown that the input device, such as a controller, can also be tracked 804 using image data obtained from captured video frames by the camera 108. Also shown is the configuration where the HMD is connected to the computing system 106 via a cable 806. In one embodiment, the HMD obtains power from the same cable or can connect to another cable for receiving power. In still another embodiment, the HMD can have a battery that is rechargeable, so as to avoid extra power cords.

An exemplary head-mounted display (HMD) 102 includes a plurality of trackable indicators, such as lights, LEDs, etc., distributed throughout the outer surface of the HMD. Each of these indicators may be configured to have specific shapes and/or positions, and can be configured to have the same or different colors. It will be appreciated that the lights can be identified as visual markers in captured images of an interactive environment in which a user uses the HMD 102.

An image capturing device 108, such as a camera or a set of cameras, may be used to track indicators to determine the location and orientation of the HMD 102 in the interactive environment. Depending on the particular orientation of the HMD 102, some of the indicators may be visible while others may be hidden from the camera. In some embodiments, inertial sensors disposed in the HMD 102 may be used to provide feedback regarding positioning, without the need for tracking the indicators. In some embodiments, the indicators and inertial sensors work together, to enable mixing and selection of position/motion data.

In one embodiment, the indicators can be configured to provide a current status of the HMD to others in the vicinity. Consequently, the indicators are configured to exhibit a certain color arrangement, intensity arrangement, be configured to blink, have a certain on/off configuration, or other arrangement indicating a current status of the HMD 102.

The HMD 102 may additionally include one or more microphones. By utilizing an array of microphones, sound from each of the microphones can be processed to determine the location of the sound's source. This information can be utilized in various ways, including exclusion of unwanted sound sources, association of a sound source with a visual identification, etc.

The HMD 102 may also include one or more image capture devices. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. Such video can be augmented with virtual elements to provide an augmented reality experience, or may be combined or blended with virtual elements in other ways. It should be appreciated that there may be any number of externally facing cameras or a single camera can be installed on the HMD 102, and oriented in any direction, including the front, the sides and/or the back.

Figure 7:
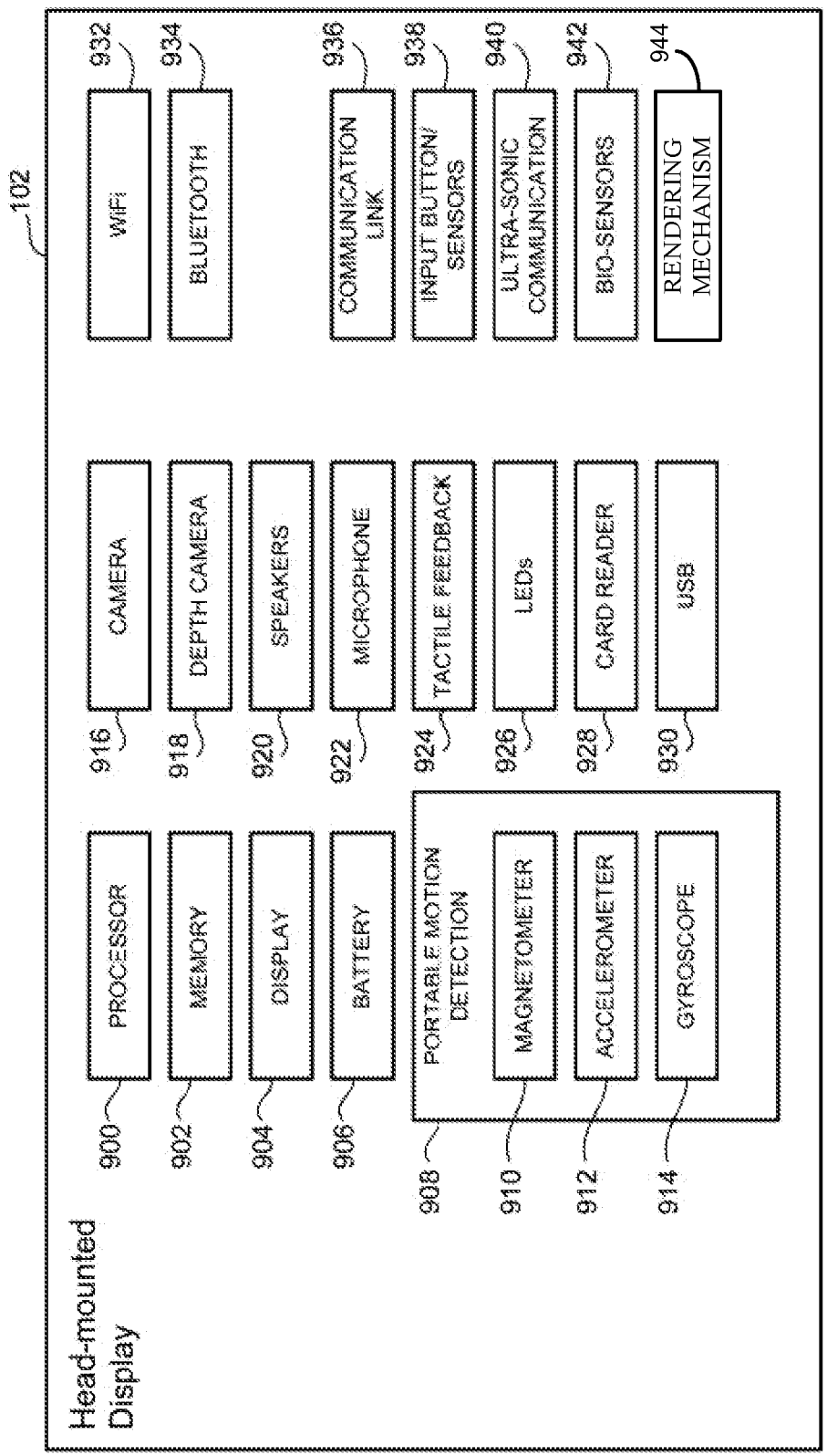
FIG. 7 illustrates exemplary components of a head-mounted display, in accordance with one embodiment of the present invention.

With reference to FIG. 7, a diagram is shown illustrating example components of a head-mounted display 102, in accordance with an embodiment of the invention. It should be understood that more or less components can be included or excluded from the HMD 102, depending on the configuration and functions enabled. The head-mounted display 102 may include a processor 900 for executing program instructions. A memory 902 is provided for storage purposes, and may include both volatile and non-volatile memory. A display 904 is included which provides a visual interface that a user may view.

The display 904 can be defined by one single display, or in the form of a separate display screen for each eye. When two display screens are provided, it is possible to provide left-eye and right-eye video content separately. Separate presentation of video content to each eye, for example, can provide for better immersive control of three-dimensional (3D) content. As described above, in one embodiment, the second screen 107 is provided with second screen content of the HMD 102 by using the output for one eye, and then formatting the content for display in a 2D format. The one eye, in one embodiment, can be the left-eye video feed, but in other embodiments it can be the right-eye video feed.

A battery 906 may be provided as a power source for the head-mounted display 102. In other embodiments, the power source can include an outlet connection to power. In other embodiments, an outlet connection to power and a battery 906 may be provided. A motion detection module 908 may include any of various kinds of motion sensitive hardware, such as a magnetometer 910, an accelerometer 912, and a gyroscope 914.

An accelerometer is a device for measuring acceleration and gravity induced reaction forces. Single and multiple axis (e.g., six-axis) models are able to detect magnitude and direction of the acceleration in different directions. The accelerometer is used to sense inclination, vibration, and shock. In one embodiment, three accelerometers 912 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 910 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 912 is used together with magnetometer 910 to obtain the inclination and azimuth of the head-mounted display 102.

A gyroscope is a device for measuring or maintaining orientation, based on the principles of angular momentum. In one embodiment, three gyroscopes 914 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 916 is provided for capturing images and image streams of a real environment. More than one camera (optionally) may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 918 may be included in the head-mounted display 102 for sensing depth information of objects in a real environment.

The head-mounted display 102 includes speakers 920 for providing audio output. Also, a microphone 922 may be included for capturing audio from the real environment, including sounds from the ambient environment, speech made by the user, etc. The head-mounted display 102 includes tactile feedback module 924 for providing tactile feedback to the user. In one embodiment, the tactile feedback module 924 is capable of causing movement and/or vibration of the head-mounted display 102 so as to provide tactile feedback to the user.

LEDs 926 are provided as visual indicators of statuses of the head-mounted display 102. For example, an LED may indicate battery level, power on, etc. A card reader 928 is provided to enable the head-mounted display 102 to read and write information to and from a memory card. A USB interface 930 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A WiFi module 932 may be included for enabling connection to the Internet via wireless networking technologies. Also, the head-mounted display 102 may include a Bluetooth module 934 for enabling wireless connection to other devices. A communications link 936 may also be included for connection to other devices. In one embodiment, the communications link 936 utilizes infrared transmission for wireless communication. In other embodiments, the communications link 936 may utilize any of various wireless or wired transmission protocols for communication with other devices.

Input buttons/sensors 938 are included to provide an input interface for the user. Any of various kinds of input interfaces may be included, such as buttons, gestures, touchpad, joystick, trackball, etc. An ultra-sonic communication module 940 may be included in head-mounted display 102 for facilitating communication with other devices via ultra-sonic technologies.

Bio-sensors 942 are included to enable detection of physiological data from a user. In one embodiment, the bio-sensors 942 include one or more dry electrodes for detecting bio-electric signals of the user through the user's skin, voice detection, eye retina detection to identify users/profiles, etc.

Rendering mechanism 944 are included to enable focusing image onto a portion of a controlling user's eye(s). In one embodiment, the rendering mechanism 944 may include one or more light emitting devices to emit light that projects the image of the content directly on to a portion of the user's eyes (for e.g., on the retina, optical nerve, etc.), making it possible to render the content without requiring a display screen.

The foregoing components of head-mounted display 102 have been described as merely exemplary components that may be included in head-mounted display 102. In various embodiments of the invention, the head-mounted display 102 may or may not include some of the various aforementioned components. Embodiments of the head-mounted display 102 may additionally include other components not presently described, but known in the art, for purposes of facilitating aspects of the present invention as herein described.

It will be appreciated by those skilled in the art that in various embodiments of the invention, the aforementioned handheld device may be utilized in conjunction with an interactive application displayed on a display to provide various interactive functions. The exemplary embodiments described herein are provided by way of example only, and not by way of limitation.

In one embodiment, clients and/or client devices, as referred to herein, may include head mounted displays (HMDs), terminals, personal computers, game consoles, tablet computers, telephones, set-top boxes, kiosks, wireless devices, digital pads, stand-alone devices, handheld game playing devices, and/or the like. Typically, clients are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to client or on a separate device such as a monitor or television.

Clients are optionally configured to support more than one game player. For example, a game console may be configured to support two, three, four or more simultaneous players (e.g., P1, P2, . . . Pn). Each of these players may receive or share a video stream, or a single video stream may include regions of a frame generated specifically for each player, e.g., generated based on each player's point of view. Any number of clients can be local (e.g., co-located) or are geographically dispersed. The number of clients included in a game system may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user.

For example, a game console and an HMD may cooperate with the video server system to deliver a game viewed through the HMD. In one embodiment, the game console receives the video stream from the video server system and the game console forwards the video stream, or updates to the video stream, to the HMD and/or television for rendering.

Still further, the HMD can be used for viewing and/or interacting with any type of content produced or used, such video game content, movie content, video clip content, web content, advertisement content, contest content, gamboling game content, conference call/meeting content, social media content (e.g., posting, messages, media streams, friend events and/or game play), video portions and/or audio content, and content made for consumption from sources over the internet via browsers and applications and any type of streaming content. Of course, the foregoing listing of content is not limiting, as any type of content can be rendered so long as it can be viewed in the HMD or rendered to a screen or screen of the HMD.

Clients may, but are not required to, further include systems configured for modifying received video. For example, a client may be configured to perform further rendering, to overlay one video image on another video image, to crop a video image, and/or the like. For example, clients may be configured to receive various types of video frames, such as I-frames, P-frames and B-frames, and to process these frames into images for display to a user. In some embodiments, a member of clients is configured to perform further rendering, shading, conversion to 3-D, conversion to 2D, distortion removal, sizing, or like operations on the video stream. A member of clients is optionally configured to receive more than one audio or video stream.

Input devices of clients may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

A video source may include rendering logic, e.g., hardware, firmware, and/or software stored on a computer readable medium such as storage. This rendering logic is configured to create video frames of the video stream based on the game state. All or part of the rendering logic is optionally disposed within one or more graphics processing unit (GPU). Rendering logic typically includes processing stages configured for determining the three-dimensional spatial relationships between objects and/or for applying appropriate textures, etc., based on the game state and viewpoint. The rendering logic can produce raw video that is encoded. For example, the raw video may be encoded according to an Adobe Flash® standard, HTML-5, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a device. The video stream is characterized by a frame size and a frame rate. Typical frame sizes include 800×600, 1280×720 (e.g., 720p), 1024×768, 1080p, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In some embodiments, the client can be a general purpose computer, a special purpose computer, a gaming console, a personal computer, a laptop computer, a tablet computer, a mobile computing device, a portable gaming device, a cellular phone, a set-top box, a streaming media interface/device, a smart television or networked display, or any other computing device capable of being configured to fulfill the functionality of a client as defined herein. In one embodiment, a cloud gaming server is configured to detect the type of client device which is being utilized by the user, and provide a cloud-gaming experience appropriate to the user's client device. For example, image settings, audio settings and other types of settings may be optimized for the user's client device.

Figure 8:
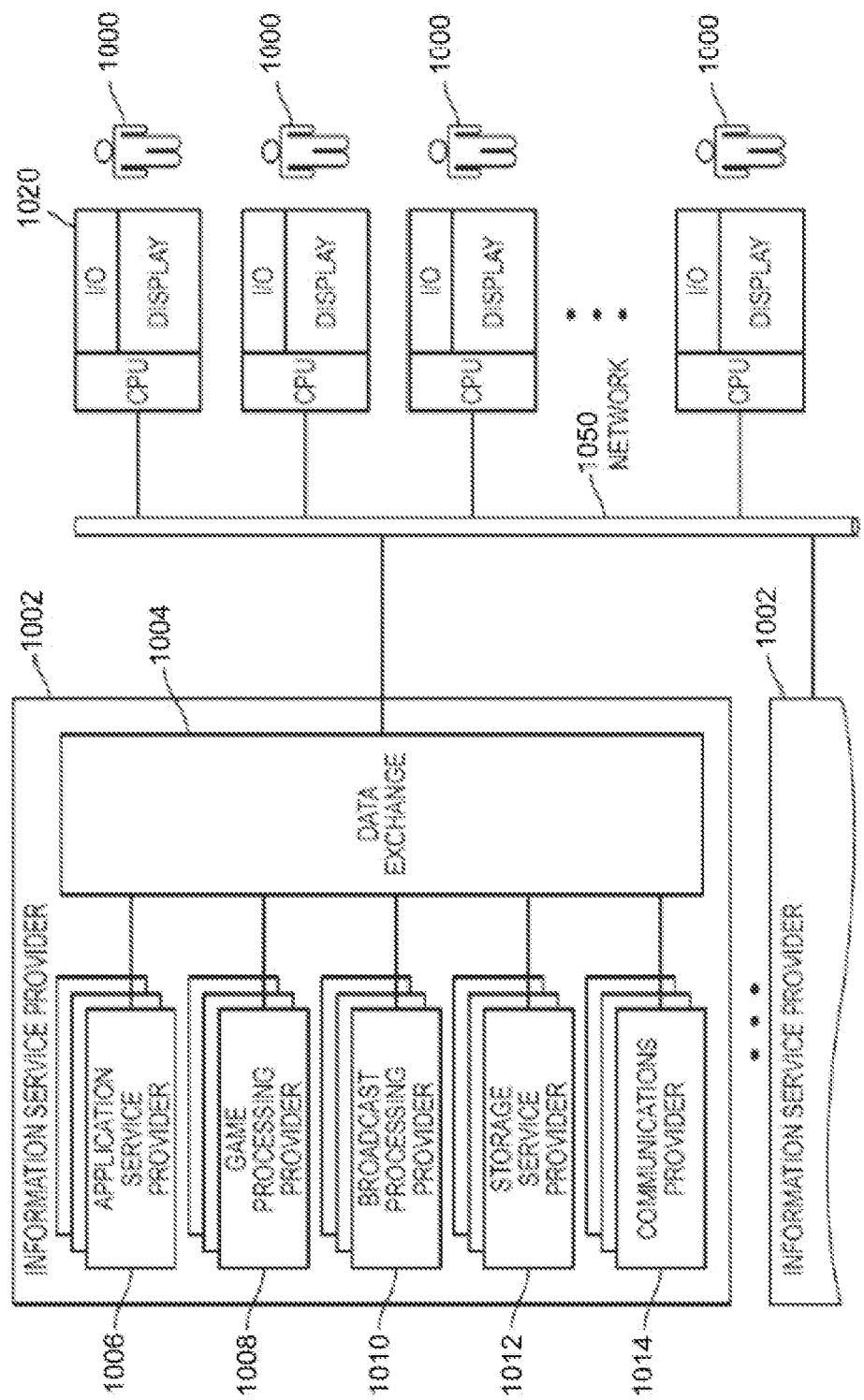
FIG. 8 illustrates an exemplary Information Service Provider architecture for delivering informational content and services to users who are geographically dispersed and connected via network, in accordance with one embodiment of the present invention.

FIG. 8 illustrates an embodiment of an Information Service Provider architecture. Information Service Providers (ISP) 1070 delivers a multitude of information services to users 1082 geographically dispersed and connected via network 1086. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 1070 includes Application Service Provider (ASP) 1072, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1070 includes a Game Processing Server (GPS) 1074 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1076 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1078 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 1080 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1088 interconnects the several modules inside ISP 1070 and connects these modules to users 1082 via network 1086. Data Exchange 1088 can cover a small area where all the modules of ISP 1070 are in close proximity, or can cover a large geographic area when the different modules are geographically dispersed. For example, Data Exchange 1088 can include a fast Gigabit Ethernet (or faster) within a cabinet of a data center, or an intercontinental virtual area network (VLAN).

Users 1082 access the remote services with client device 1084, which includes at least a CPU, a display and I/O. The client device can be a PC, a mobile phone, a netbook, tablet, gaming system, a PDA, etc. In one embodiment, ISP 1070 recognizes the type of device used by the client and adjusts the communication method employed. In other cases, client devices use a standard communications method, such as html, to access ISP 1070.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium or it can be embodied as executable instructions that can be downloaded from a source, such as a cloud server, a remote server, a virtual server, etc., and executed by a processor of a computing device. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the described embodiments.

Figure 9:
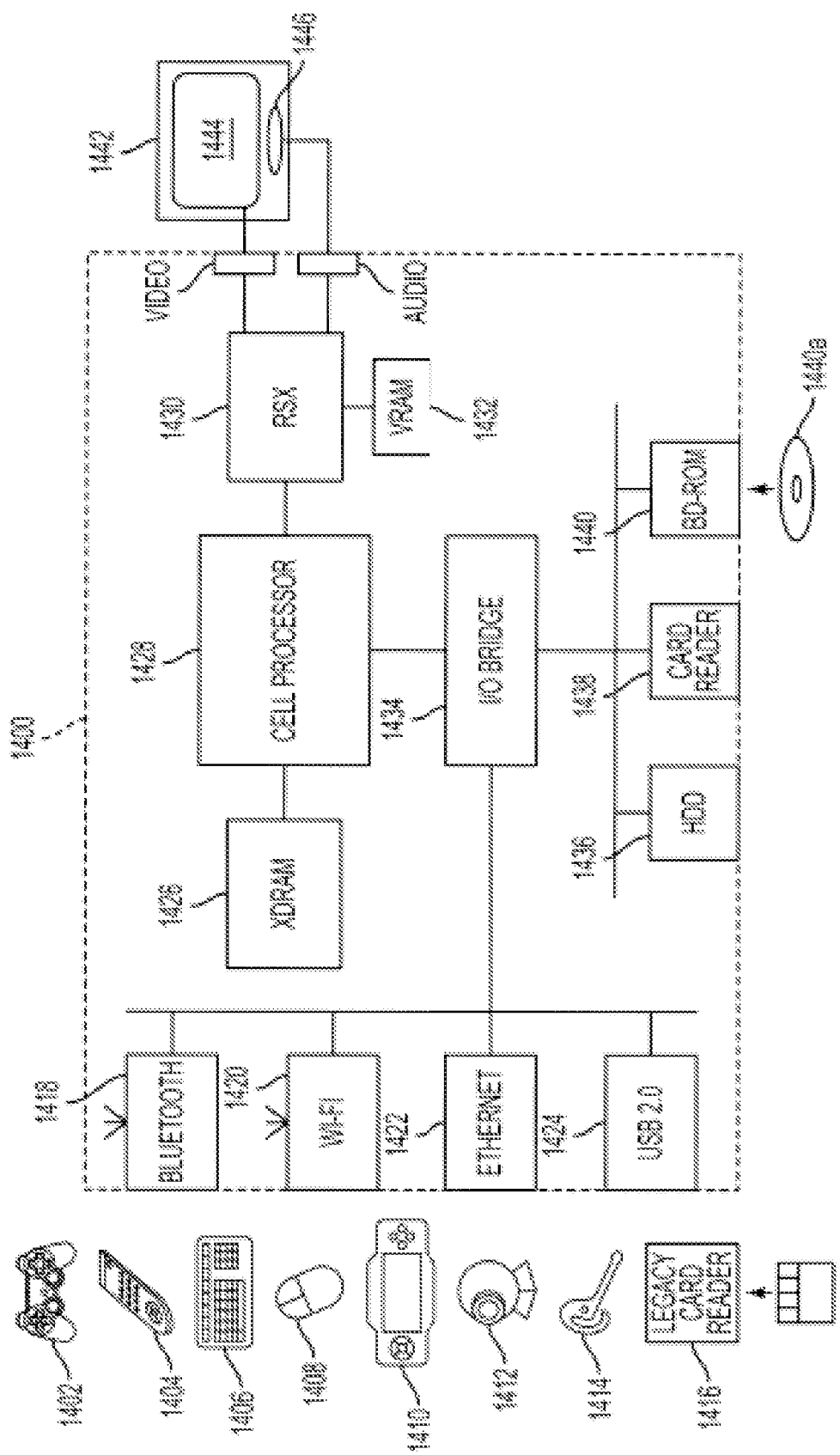
FIG. 9 illustrates exemplary components of a computing device used for controlling content presented to a user, in accordance with one embodiment of the invention.

FIG. 9 schematically illustrates the overall system architecture of a gaming console, such as Sony® Playstation 3® entertainment device, that may be compatible with controllers for implementing an avatar control system in accordance with one embodiment of the present invention. A system unit 1400 is provided, with various peripheral devices connectable to the system unit 1400. The system unit 1400 is similar to the computing device 106 of FIG. 1A. The system unit 1400 comprises: a Cell processor 1428; a Rambus® dynamic random access memory (XDRAM) unit 1426; a Reality Synthesizer graphics unit 1430 with a dedicated video random access memory (VRAM) unit 1432; and an I/O bridge 1434. The system unit 1400 also comprises a Blu Ray® Disk BD-ROM® optical disk reader 1440 for reading from a disk 1440a and a removable slot-in hard disk drive (HDD) 1436, accessible through the I/O bridge 1434. Optionally the system unit 1400 also comprises a memory card reader 1438 for reading compact flash memory cards, Memory Stick® memory cards and the like, which is similarly accessible through the I/O bridge 1434.

The I/O bridge 1434 also connects to six Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

In operation the I/O bridge 1434 handles all wireless, USB and Ethernet data, including data from one or more game controllers 1402. For example when a user is playing a game, the I/O bridge 1434 receives data from the game controller 1402 via a Bluetooth link and directs it to the Cell processor 1428, which updates the current state of the game accordingly.

The wireless, USB and Ethernet ports also provide connectivity for other peripheral devices in addition to game controllers 1402, such as: a remote control 1404; a keyboard 1406; a mouse 1408; a portable entertainment device 1410 such as a Sony Playstation Portable® entertainment device; a video camera such as an EyeToy® video camera 1412; and a microphone headset 1414. Such peripheral devices may therefore in principle be connected to the system unit 1400 wirelessly; for example the portable entertainment device 1410 may communicate via a Wi-Fi ad-hoc connection, whilst the microphone headset 1414 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 1416 may be connected to the system unit via a USB port 1424, enabling the reading of memory cards 1448 of the kind used by the Playstation® or Playstation 2® devices.

In the present embodiment, the game controller 1402 is operable to communicate wirelessly with the system unit 1400 via the Bluetooth link. However, the game controller 1402 can instead be connected to a USB port, thereby also providing power by which to charge the battery of the game controller 1402. In addition to one or more analog joysticks and conventional control buttons, the game controller is sensitive to motion in six degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1404 is also operable to communicate wirelessly with the system unit 1400 via a Bluetooth link. The remote control 1404 comprises controls suitable for the operation of the Blu Ray™ Disk BD-ROM reader 1440 and for the navigation of disk content.

The Blu Ray™ Disk BD-ROM reader 1440 is operable to read CD-ROMs compatible with the Playstation and PlayStation 2 devices, in addition to conventional pre-recorded and recordable CDs, and so-called Super Audio CDs. The reader 1440 is also operable to read DVD-ROMs compatible with the Playstation 2 and PlayStation 3 devices, in addition to conventional pre-recorded and recordable DVDs. The reader 1440 is further operable to read BD-ROMs compatible with the Playstation 3 device, as well as conventional pre-recorded and recordable Blu-Ray Disks.

The system unit 1400 is operable to supply audio and video, either generated or decoded by the Playstation 3 device via the Reality Synthesizer graphics unit 1430, through audio and video connectors to a display and sound output device 1442 such as a monitor or television set having a display 1444 and one or more loudspeakers 1446. The audio connectors 1450 may include conventional analogue and digital outputs whilst the video connectors 1452 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1428. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1412 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1400. The camera LED indicator is arranged to illuminate in response to appropriate control data from the system unit 1400, for example to signify adverse lighting conditions. Embodiments of the video camera 1412 may variously connect to the system unit 1400 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 1400, an appropriate piece of software such as a device driver should be provided. Device driver technology is well-known and will not be described in detail here, except to say that the skilled man will be aware that a device driver or similar software interface may be required in the present embodiment described.

Referring now to FIG. 15, the Cell processor 1428 has an architecture comprising four basic components: external input and output structures comprising a memory controller 1560 and a dual bus interface controller 1570A,B; a main processor referred to as the Power Processing Element 1550; eight co-processors referred to as Synergistic Processing Elements (SPEs) 1510A-H; and a circular data bus connecting the above components referred to as the Element Interconnect Bus 1580. The total floating point performance of the Cell processor is 218 GFLOPS, compared with the 6.2 GFLOPs of the Playstation 2 device's Emotion Engine.

The Power Processing Element (PPE) 1550 is based upon a two-way simultaneous multithreading Power 1470 compliant PowerPC core (PPU) 1555 running with an internal clock of 3.2 GHz. It comprises a 512 kB level 2 (L2) cache and a 32 kB level 1 (L1) cache. The PPE 1550 is capable of eight single position operations per clock cycle, translating to 25.6 GFLOPs at 3.2 GHz. The primary role of the PPE 1550 is to act as a controller for the Synergistic Processing Elements 1510A-H, which handle most of the computational workload. In operation the PPE 1550 maintains a job queue, scheduling jobs for the Synergistic Processing Elements 1510A-H and monitoring their progress. Consequently each Synergistic Processing Element 1510A-H runs a kernel whose role is to fetch a job, execute it and synchronized with the PPE 1550.

Each Synergistic Processing Element (SPE) 1510A-H comprises a respective Synergistic Processing Unit (SPU) 1520A-H, and a respective Memory Flow Controller (MFC) 1540A-H comprising in turn a respective Dynamic Memory Access Controller (DMAC) 1542A-H, a respective Memory Management Unit (MMU) 1544A-H and a bus interface (not shown). Each SPU 1520A-H is a RISC processor clocked at 3.2 GHz and comprising 256 kB local RAM 1530A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 1520A-H does not directly access the system memory XDRAM 1426; the 64-bit addresses formed by the SPU 1520A-H are passed to the MFC 1540A-H which instructs its DMA controller 1542A-H to access memory via the Element Interconnect Bus 1580 and the memory controller 1560.

The Element Interconnect Bus (EIB) 1580 is a logically circular communication bus internal to the Cell processor 1428 which connects the above processor elements, namely the PPE 1550, the memory controller 1560, the dual bus interface 1570A,B and the 8 SPEs 1510A-H, totaling 12 participants. Participants can simultaneously read and write to the bus at a rate of 8 bytes per clock cycle. As noted previously, each SPE 1510A-H comprises a DMAC 1542A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 1560 comprises an XDRAM interface 1562, developed by Rambus Incorporated. The memory controller interfaces with the Rambus XDRAM 1426 with a theoretical peak bandwidth of 25.6 GB/s.

The dual bus interface 1570A,B comprises a Rambus FlexIO® system interface 1572A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 1428 to the Reality Simulator graphics unit 1430 will typically comprise display lists, being a sequence of commands to draw vertices, apply textures to polygons, specify lighting conditions, and so on.

Embodiments may include capturing depth data to better identify the real-world user and to direct activity of an avatar or scene. The object can be something the person is holding or can also be the person's hand. In the this description, the terms "depth camera" and "three-dimensional camera" refer to any camera that is capable of obtaining distance or depth information as well as two-dimensional pixel information. For example, a depth camera can utilize controlled infrared lighting to obtain distance information. Another exemplary depth camera can be a stereo camera pair, which triangulates distance information using two standard cameras. Similarly, the term "depth sensing device" refers to any type of device that is capable of obtaining distance information as well as two-dimensional pixel information.

Recent advances in three-dimensional imagery have opened the door for increased possibilities in real-time interactive computer animation. In particular, new "depth cameras" provide the ability to capture and map the third-dimension in addition to normal two-dimensional video imagery. With the new depth data, embodiments of the present invention allow the placement of computer-generated objects in various positions within a video scene in real-time, including behind other objects.

Moreover, embodiments of the present invention provide real-time interactive gaming experiences for users. For example, users can interact with various computer-generated objects in real-time. Furthermore, video scenes can be altered in real-time to enhance the user's game experience. For example, computer generated costumes can be inserted over the user's clothing, and computer generated light sources can be utilized to project virtual shadows within a video scene. Hence, using the embodiments of the present invention and a depth camera, users can experience an interactive game environment within their own living room. Similar to normal cameras, a depth camera captures two-dimensional data for a plurality of pixels that comprise the video image. These values are color values for the pixels, generally red, green, and blue (RGB) values for each pixel. In this manner, objects captured by the camera appear as two-dimension objects on a monitor.

Embodiments of the present invention also contemplate distributed image processing configurations. For example, the invention is not limited to the captured image and display image processing taking place in one or even two locations, such as in the CPU or in the CPU and one other element. For example, the input image processing can just as readily take place in an associated CPU, processor or device that can perform processing; essentially all of image processing can be distributed throughout the interconnected system. Thus, the present invention is not limited to any specific image processing hardware circuitry and/or software. The embodiments described herein are also not limited to any specific combination of general hardware circuitry and/or software, nor to any particular source for the instructions executed by processing components.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system, including an electromagnetic wave carrier. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method, comprising:
    identifying content from a virtual space for presenting on a display screen of a head mounted display (HMD) worn by a user, in response to a request from the user, the content is interactive content representing a virtual environment surrounding a virtual character of the user in the virtual space, the content changing dynamically to correspond with change in view direction of the virtual character of the user included in the virtual space;
    examining the content to determine a type of filter to apply to a portion of the content that needs to be filtered out, the type of filter identified to correspond with a type of a component within the portion of the content that does not meet filtering rules defined for a user profile of the user;
    dynamically filtering out the component in the portion of the content using the type of filter identified for the component of the portion of the content; and
    forwarding the content of the virtual environment with the component filtered out in the portion for rendering on the HMD, the content included in the virtual environment meeting a standard established for the user profile of the user,
    wherein the changes to the content identified for presenting being continually examined to identify one or more additional components that is to be filtered out, in accordance to the filtering rules defined in the user profile of the user, the identifying of one or more additional components includes,
        identifying and applying one or more additional types of filters that correspond with types of the one or more components prior to forwarding the content, as changes in the content in the virtual environment are detected.

2. The method of claim 1, wherein the type of filter identified for filtering out changes based on changes occurring in the content of the virtual environment.

3. The method of claim 1, wherein the content representing the virtual environment of the user is a sub-set of content representing the virtual space.

4. The method of claim 1, wherein the changes to the content in the virtual space are detected when a virtual object moves toward the virtual character of the user, or when the virtual character of the user moves toward one or more virtual objects in the virtual space.

5. The method of claim 1, wherein filtering out the content further includes changing, or replacing, or removing the component in the portion of the content that is not in accordance to the filtering rules defined for the user profile of the user, wherein the changing or replacing includes presenting an alternate component identified to be appropriate for the user in place of the component, the alternate component is identified to be contextually related to the content.

6. The method of claim 1, wherein the portion of content includes a plurality of components, and wherein the component that is being filtered out is one component of the plurality of components included in the portion, wherein the component that is being filtered out in the portion is not in accordance to user profile of the user.

7. The method of claim 6, wherein the plurality of components includes any one or combination of an audio component, or an image component, or a textual component, or a graphic component, or a video component.

8. The method of claim 7, wherein when the component to be filtered out in the portion is an audio component, the type of filter applied to the portion is an audio filter and filtering out the component of the portion of the content further includes identifying a different audio component that is in accordance to the user profile of the user and replacing the audio component that is being filtered out in the portion of the content with the different audio component, a length of the different audio component identified for replacing matches a length of a portion of the audio component that is being filtered out and the different audio component is identified to match context of the content.

9. The method of claim 7, wherein when the component to be filtered out in the portion is one of a video component, or a textual component, or a graphic component, the type of filter applied to the portion is a video filter or a textual filter or a graphic filter and filtering out the component of the portion of the content further includes identifying a different video component, or a different textual component, or a different graphic component that is in accordance to the user profile of the user, and overlaying the different video component, the different textual component or the different graphic component over the portion of the corresponding video component, or the textual component or the graphic component that is being filtered out.

10. The method of claim 1, wherein the content included in the virtual space includes content generated via user interactions of other users, and wherein filtering out the portion of the content includes filtering out the portion of content provided by one or more of the other users whose interactions are not in accordance to user profile of the user.

11. The method of claim 10, wherein the other users are identified from social contacts of the user.

12. The method of claim 1, wherein the content included in the virtual space includes content generated via user interactions of other users, wherein the type of filter applied to the portion is an image filter, and wherein filtering out the content includes filtering out an image representation of the one other user identified from the other users and included in the content, the one other user providing content that is not in accordance with the filtering rules specified in the user profile of the user, the filtering out the image representation of the one other user results in filtering out the content generated by the one other user from the content included in the virtual environment.

13. A method, comprising:

identifying content from a virtual space for presenting on a display screen of a head mounted display (HMD) worn by a user, in response to a request for content from the user, the content is interactive content representing a virtual environment surrounding a virtual character of the user in the virtual space, the content changing dynamically to correspond with changes identified in the virtual space;

dynamically filtering out a component in a portion of the content in accordance to a filtering rule identified in a user profile of the user, prior to forwarding the content to the HMD, the filtering includes identifying a type of filter to apply to the component, the type of filter identified to correspond with a type associated with the component, wherein the filtering rule is generated in accordance to user preferences specified in the user profile of the user; and forwarding the content of the virtual environment filtered in accordance to the filtering rule for rendering on the HMD, the content included in the virtual environment of the user meets a standard established for the user profile of the user, the changes in the content identified for presenting being continually filtered, in accordance to the filtering rule of the user, by applying one or more additional types of filters identified to correspond with one or more additional components that do not meet filtering rule specified for the user.

14. The method of claim 13, wherein the content includes a plurality of types of components, wherein the plurality of types of components includes any one or a combination of an audio component, or a video component, or a textual component, or a graphic component, or an image component.

15. The method of claim 14, wherein filtering out a portion of the content further includes changing, or replacing, or removing the component in the portion of the content that is not in accordance to the filtering rule defined for the user profile of the user, wherein the changing or replacing includes presenting an alternate component identified to be appropriate for the user in place of the component, the alternate component identified to be contextually related to the content.

16. The method of claim 13, wherein the content included in the virtual space includes content generated via user interactions of other users, and wherein filtering out a portion of the content includes filtering out the portion of the content provided by a one other user.

17. The method of claim 16, wherein the other users are identified from social contacts of the user.

18. The method of claim 13, wherein the content included in the virtual space includes content generated via user interactions of other users, and wherein filtering out the portion of the content includes filtering out one other user, the one other user providing content that is not in accordance with the user profile of the user, the filtering out the one other user results in filtering out the content generated by the one other user from the content included in the virtual environment.

* * * * *